(12) United States Patent
Ichikawa et al.

(10) Patent No.: US 7,418,624 B2
(45) Date of Patent: Aug. 26, 2008

(54) HOT STANDBY SYSTEM

(75) Inventors: Masaya Ichikawa, Sagamihara (JP); Yuzuru Maya, Sagamihara (JP); Hideaki Sampei, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 652 days.

(21) Appl. No.: 10/958,735

(22) Filed: Oct. 4, 2004

(65) Prior Publication Data

US 2005/0289391 A1    Dec. 29, 2005

(30) Foreign Application Priority Data

Jun. 29, 2004    (JP)    ............................. 2004-190818

(51) Int. Cl.
G06F 11/00    (2006.01)
(52) U.S. Cl. ........................................... 714/9; 714/13
(58) Field of Classification Search .................. 714/13, 714/9
See application file for complete search history.

(56) References Cited

U.S. PATENT DOCUMENTS

| | | | |
|---|---|---|---|
| 6,237,108 B1 * | 5/2001 | Ogawa et al. ................... | 714/6 |
| 6,321,346 B1 * | 11/2001 | Murotani et al. ................ | 714/9 |
| 6,636,984 B1 | 10/2003 | McBrearty et al. | |
| 6,957,361 B2 * | 10/2005 | Kahler et al. ................... | 714/9 |
| 6,983,397 B2 * | 1/2006 | Fairhurst et al. ................ | 714/9 |
| 2001/0020282 A1 * | 9/2001 | Murotani et al. ................ | 714/9 |
| 2006/0089975 A1 * | 4/2006 | Iwamoto ...................... | 709/213 |

FOREIGN PATENT DOCUMENTS

JP    10-289122    10/1998

OTHER PUBLICATIONS

King, Richard P. and Halim, Nagui, Management of a Remote Backup Copy for Disaster Recovery, ACM Transactions on Databse System, vol. 16, No. 2, Jun. 1991, pp. 338-368.*

* cited by examiner

Primary Examiner—Christopher S McCarthy
(74) Attorney, Agent, or Firm—Townsend and Townsend and Crew LLP

(57)    ABSTRACT

Consistency of a shared disk is secured in system switching in a hot standby system. In the standby system in which an active computer and standby computer share the shared disk, when a write I/O request is issued from the active computer, information about a start of the I/O is recorded in, for example, a memory. When the I/O is completed, the information is deleted from the memory. When a failure occurs in the active computer, the active computer transmits the record of the information about the start of the I/O, to the standby computer. The standby computer verifies the record to recover a disk in which the I/O is to be executed.

9 Claims, 26 Drawing Sheets

CONSISTENCY CHECK PROGRAM (1150)

ACCESS REQUEST MANAGEMENT TABLE ENTRY

DEVICE DRIVER

HOT STANDBY SYSTEM

CROSS-REFERENCE TO RELATED APPLICATION

The present application claims priority from Japanese application JP 2004-190818 filed on Jun. 29, 2004, the content of which is hereby incorporated by reference into this application.

BACKGROUND OF THE INVENTION

The present invention relates to a hot standby system. Particularly, the present invention relates to consistency check of a shared disk in a hot standby system having a shared disk accessible from active and standby computers and to a switching control between the computers.

Recently, in the field of online transaction processes, hot standby structure systems having a shared disk accessible from active and standby computers are used to improve availability of the online transaction processes.

For example, Japanese Published Unexamined Patent Application No. 1998-289122 discloses this type of hot standby system. The disclosure is as follows. One disk is connected to each of active and standby computers. In normal operation, when data is updated in the active computer, updated data is sent to the standby computer via a network so that data is updated in the standby computer in the same way as the active computer. When a failure occurs in the active computer, the standby computer takes over jobs as a new active computer, and the former active computer functions as a standby computer. After recovery from the failure, updated data after the takeover is sent from the new active computer to a new standby computer, so that synchronization is executed in a shared disk. According to this conventional technique, when the standby computer is switched, jobs can be taken over without further synchronizing data in both disks, so that a time up to a restart of the jobs can be shortened.

SUMMARY OF THE INVENTION

Because mirroring using software is such that synchronization between mirrors also uses software, the synchronization may be incomplete due to a failure to cause inconsistency between the mirrors. However, in the above conventional technique, high speed processing is planed without checking inconsistency when the standby computer takes over the jobs. Accordingly, even though inconsistency may occur between the mirrors, the inconsistency cannot be detected, so that data in an inconsistency state may be overwritten.

To solve the above problem, in a hot standby system, when a failure occurs in an active computer, a standby computer takes over processing at high speed, while maintaining consistency of a shared disk.

Concretely, in a hot standby system in which active and standby computers share a storage such as a shared disk, the following procedure is executed. The active computer, when a write I/O request for the storage is made, records information about a currently processed I/O request in a storage portion such as a memory or part of the storage as an I/O record, and when a failure occurs in the active computer in monitoring failures, notifies the failure occurrence to the standby computer. The standby computer, on receiving a notification about the failure occurrence, verifies I/O records acquired from the storage portion, and when the currently processed I/O request is found as a result of the verification, recovers the storage.

A system switching control method of a first preferable example is as follows. In an active computer, when a write I/O request for a storage is made, information about a currently processed I/O is recorded in a memory as an I/O record, when a process of the I/O request is completed, the corresponding I/O record is deleted from the memory, and when a failure occurs in the active computer, I/O records held in the memory is transmitted to a standby computer. In the standby computer, the I/O records transmitted from the active computer is received and verified, and when there is a currently processed I/O request as a result of the verification, the storage is recovered.

A system switching control method of a second preferable example is as follows. When a write I/O request for a storage is made, an active computer sends a notification about a start of an I/O to a standby computer as a preprocess for the I/O request. In the standby computer, information indicating that the I/O is currently processed is recorded in a memory when that notification is received, a notification about a completion of the I/O is sent to the standby computer as a post process of the I/O when the I/O request is completed in the active computer, the information indicating that the I/O is currently processed, the information being stored in the memory, is verified when a failure occurs in the active computer, and the storage is recovered when there is the currently processed write I/O request as a result of the verification.

A system switching control method of a third preferable example is as follows. When a write I/O request for a storage is made in an active computer, information indicating that an I/O request is currently processed is recorded in part of the storage. When a failure occurs in the active computer, information recorded in the part of the storage is referenced and verified. When the write I/O request is currently processed as a result of the verification, the storage is recovered.

A preferable example is as follows. A storage includes one or more logically-defined logical volumes respectively provided with unique identification information. Identification information about a logical volume to be accessed and information for counting currently processed I/O requests of I/O requests for logical volumes are stored in a memory or part of the storage as the I/O records.

One example is as follows. The I/O record is stored in a table form having entries for every I/O request. Table information is sent from an active computer to a standby computer via a network.

DESCRIPTION OF THE PREFERRED EMBODIMENTS

In the following, embodiments are explained in reference to the accompanying drawings.

First Embodiment

First, referring to FIGS. 1 to 14, a first embodiment is explained.

Figure 1:
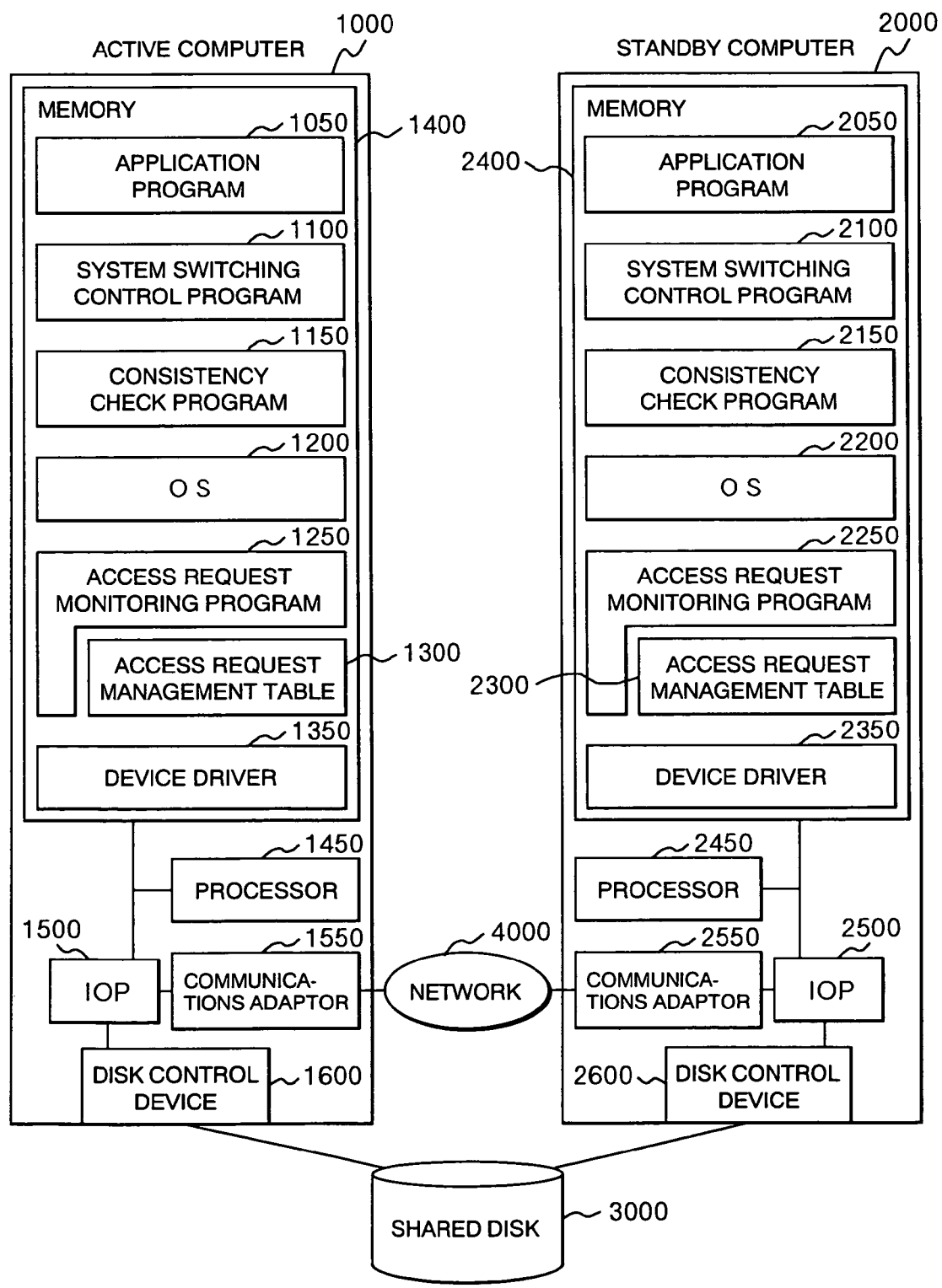
FIG. 1 is an overview block diagram of a hot standby system in a first embodiment.

FIG. 1 is an overview block diagram of a hot standby system of the first embodiment. A computer system to which the hot standby system is applied includes an active computer 1000, a standby computer 2000, a shared disk 3000 commonly accessible from both computers, and a network 4000 for connecting among the computers and disk. The active and standby computers 1000, 2000 have the same structure, and respectively include memories 1400, 2400, processors 1450, 2450, input output processors (hereinafter called IOPs) 1500, 2500, communications adaptors 1550, 2550, and disk control devices 1600, 2600.

The shared disk 3000 includes one or more logical volumes. Each volume has a logical volume ID by which it is uniquely identified. The network 4000 connects the active and standby computers 1000, 2000 in accordance with a predetermined protocol. Usually, a third computer other than the active and standby computers 1000, 2000, and electronic devices may be connected to the computer system of FIG. 1, but are not shown.

The memory 1400 of the active computer 1000 and the memory 2400 of the standby computer 2000 respectively store, as software, application programs 1050, 2050, system switching control programs 1100, 2100, consistency check programs 1150, 2150, OS (operating system) 1200, 2200, access request monitoring programs 1250, 2250, access request management tables 1300, 2300, and device drivers 1350, 2350. Each computer has one or more application programs. The application programs 1050, 2050 execute jobs such as transaction processes, and issue I/Os to the shared disk 3000. The system switching control programs 1100, 2100 detect failures of the computers where they are included, and execute hot standby switching. The computer switch control programs 1100, 2100 respectively operating in the active and standby computers detect failures occurred in the active computer, and execute the hot standby switching by cooperating with each other.

The consistency check programs 1150, 2150 check consistency of the logical volumes structuring the shared disk. In accordance with a result of the check, a recovery program is executed for a logical volume suspected of the inconsistency. The OS 1200, 2200, in response to I/O requests which the application programs 1050, 2050 issue to the logical volumes, request the access request monitoring programs 1250, 2250 or device drivers 1350, 2350 to execute I/O processes. The access request monitoring programs 1250, 2250 monitor I/O requests for the logical volumes structuring the shared disk 3000, and, when an I/O request is issued, records the I/O request in the access request management table 1300, 2300.

The access request management tables 1300, 2300 register therein and manage the I/O requests which the application programs 1050, 2050 issue to the shared disk 3000. The device drivers 1350, 2350 execute I/O processes in response to requests from outside the drivers.

Figure 2:
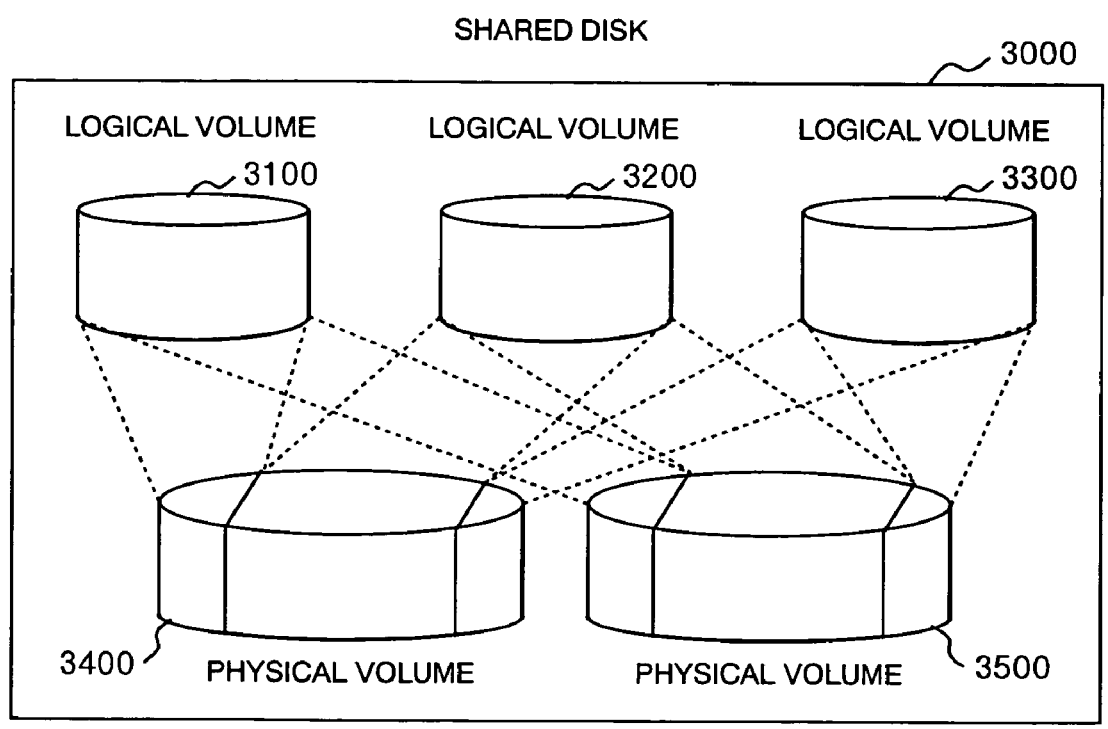
FIG. 2 is a block diagram of a shared disk 3000 in the first embodiment.

FIG. 2 shows a structure of the shared disk 3000 of the first embodiment. The shared disk 3000 includes one or more of logical volumes 3100 to 3300. The logical volume herein is a logical disk device including part or all areas of physical volume devices. The physical volume is a storage device which a physical disk device or an OS can recognize as a physical disk device. In the logical disk of the first embodiment, two physical volumes 3400, 3500 are duplicated, and mirrored for writing therein the same data.

In the following, because a structure of the components 2050 to 2600 of the standby computer 2000 is the same as the components 1050 to 1600 of the active computer 1000, the standby computer is not explained.

Figure 3:
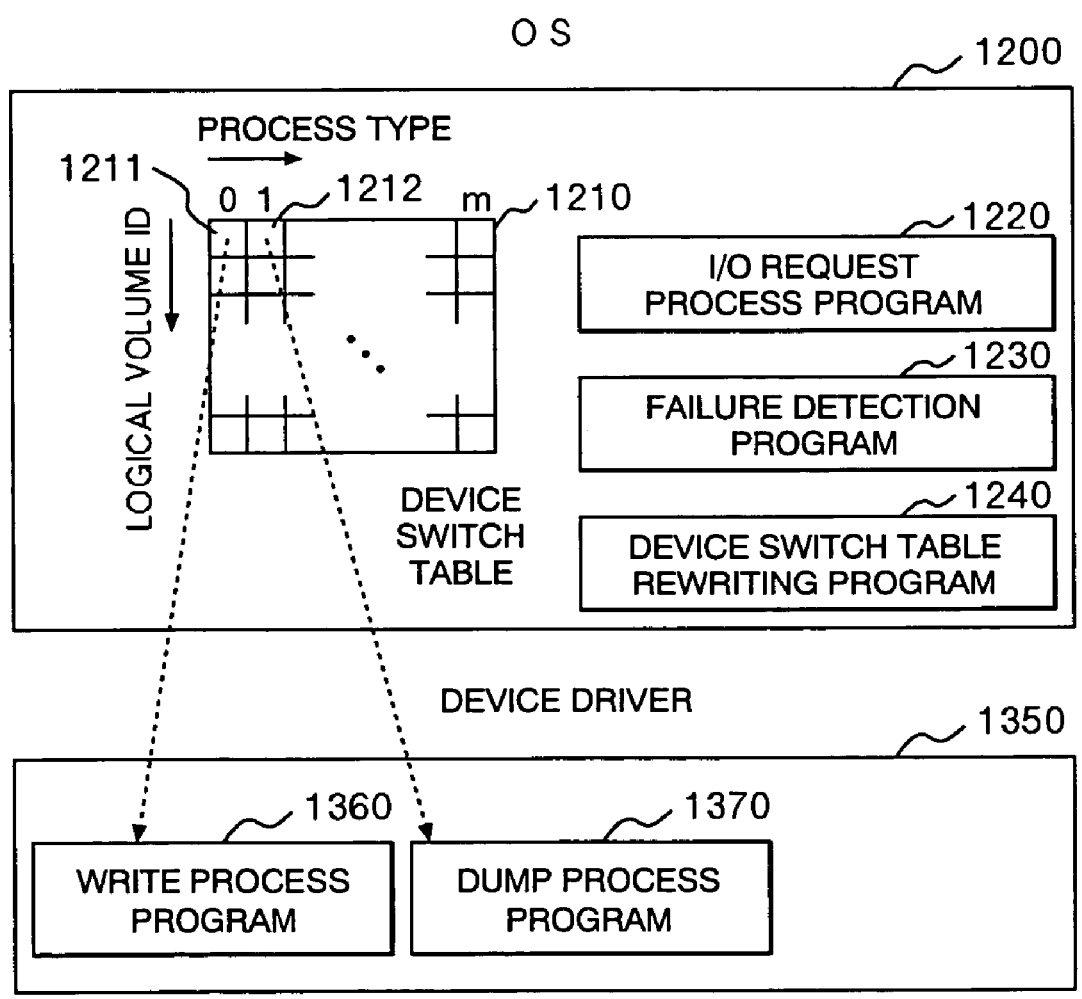
FIG. 3 is a block diagram of an OS 1200 and device driver 1350, and shows relationship therebetween in the first embodiment.

FIG. 3 shows a structure of the OS 1200 and device driver 1350 of the first embodiment. The OS 1200 includes a device switch table 1210, an I/O request process program 1220, a failure detection program 1230, and a device switch table rewriting program 1240. The device driver 1350 includes a write process program 1360 and a dump process program 1370. In addition to the above programs, program portions required for the OS and device driver exist, but are not explained because they do not relate to the explanation of this embodiment.

In the device switch table 1210, the logical volume IDs of the logical volumes of the shared disk 3000 are combined with process types for the logical volumes, such as a write process and a dump process in case of a failure, and addresses of programs for executing the processes are registered to the combinations. Process types other than the write and dump processes are not explained in this embodiment, but may be used. In FIG. 3, an address of the write process program 1360 of the device driver 1350 is registered to a device switch table entry 1211 corresponding to a write process for a logical volume ID=0. Also in FIG. 3, an address of the dump process program 1370 of the device driver 1350 is registered to a device switch table entry 1212 corresponding to a dump process for the logical volume ID=0.

The I/O request process program 1220 is called by an I/O request from the application program 1050, and calls a program of the address registered to the device switch table 1210 in accordance with an ID of a logical volume specified as the I/O target and a process type. The failure detection program 1230, when such a serious failure occurs in the active computer 1000 that a process cannot be continued, detects the failure. Then, the failure detection program 1230 refers to the device switch table entry 1212 to call a program of a registered address corresponding to a previously registered logical volume. The device switch table rewriting program 1240 is called by a request from a program inside or outside the OS 1200, and rewrites entries of the device switch table 1210.

The write process program 1360, in response to a write request for a logical volume, executes a write process for the corresponding area of a physical volume. At this time, when the logical volume is mirrored, the same write process is executed for each of duplicated physical volumes. In this embodiment, although the write process program 1360 executes the mirroring, a program other than the write process program 1360 may execute the mirroring.

The dump process program 1370 is called when a failure occurs in the OS 1200 and a process cannot be continued, and writes data stored in the memory 1400 into a disk apparatus.

Figure 4:
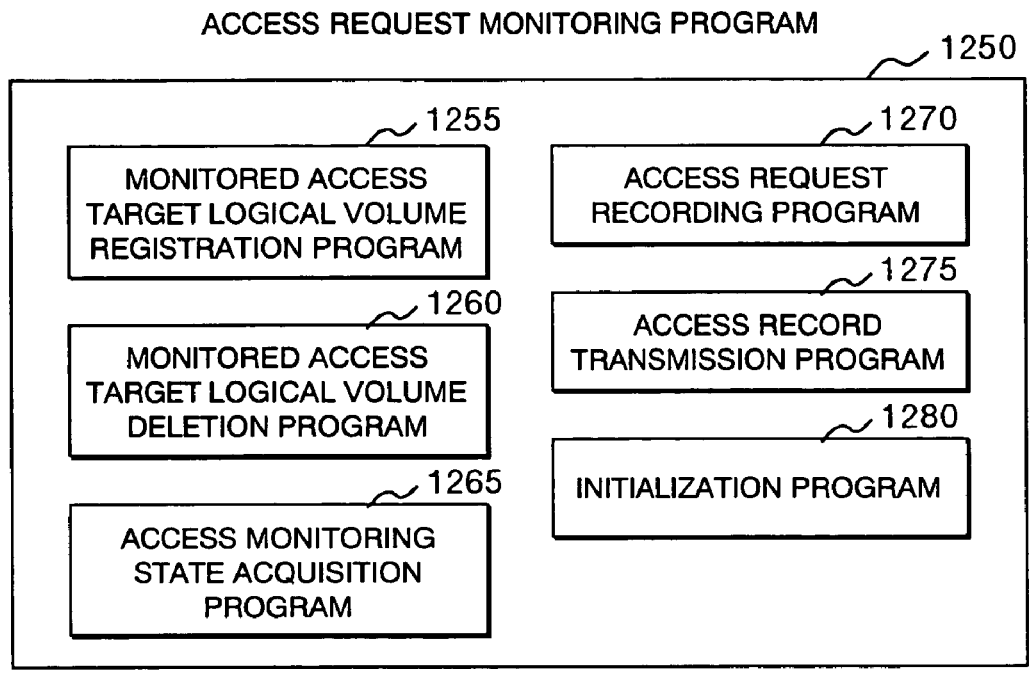
FIG. 4 is a block diagram of an access request monitoring program 1250 in the first embodiment.

FIG. 4 shows a structure of the access request monitoring program 1250 of the first embodiment. The access request monitoring program 1250 includes a monitored access target logical volume registration program 1255, a monitored access target logical volume deletion program 1260, an access monitoring state acquisition program 1265, an access request recording program 1270, an access record transmission program 1275, and an initialization program 1280. The monitored access target logical volume deletion program 1260 and access monitoring state acquisition program 1265 may be not included.

The monitored access target logical volume registration program 1255 adds a specified logical volume to logical volumes the access to which is to be monitored. An access request for the added logical volume can be recorded by the access request recording program 1270. The monitored access target logical volume registration program 1255 is called by a system call from the application program 1050 or by a user command.

The monitored access target logical volume deletion program 1260 unregisters a specified logical volume from the logical volumes the access to which is to be monitored. An access request for the unregistered logical volume cannot be recorded by the access request recording program 1270. The monitored access target logical volume deletion program 1260 is called by a system call from the application program 1050 or a user command.

The access monitoring state acquisition program 1265, in response to queries from inside or outside the program, returns a current access monitoring state of a logical volume. The access monitoring state shows, for example, whether a logical volume is registered as a monitored access target, and a current access state. The access monitoring state acquisition program 1265 is called by a system call from inside the access request monitoring program 1250 or from the application program 1050 or by a user command.

The access request recording program 1270, when accessing a logical volume the access to which is to be monitored, is called by the I/O request process program 1220. The access request recording program 1270, when an access request is a write request for the shared disk 3000, records the request in the access request management table 1300.

The access record transmission program 1275 transmits information recorded in the access request management table 1300 to the consistency check program 2150 of the standby computer 2000 via the network 4000. The access record transmission program 1275 is called from the system switching control program 1100 or the failure detection program 1230 when a failure occurs.

The initialization program 1280 rewrites the device switch table 1210 so that the access record transmission program 1275 is called in case of a dump process. The initialization program 1280 is called from the system switching control program 1100 when the system starts.

Figure 5:
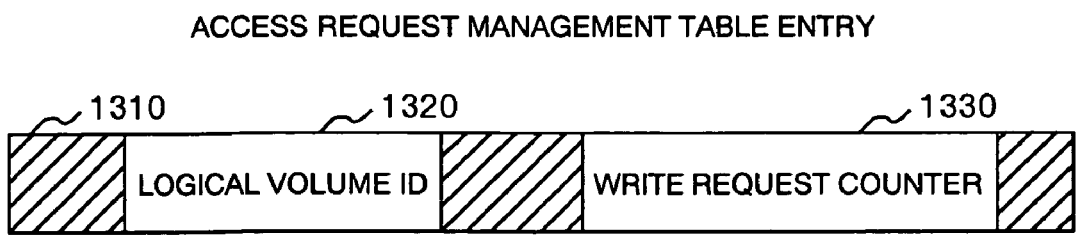
FIG. 5 is a block diagram of an entry of an access request management table 1300 in the first embodiment.

FIG. 5 shows a structure of the access request management table entry 1310 structuring the access request management table 1300. The access request management table entry 1310 includes a logical volume ID 1320 for identifying a logical volume to be accessed, and a write request counter 1330 for counting currently processed requests in write requests for the shared disk. The access request management table entry 1310 is updated by the access request recording program 1270. In FIG. 5, other fields may be stored in the slashed portions.

Figure 6:
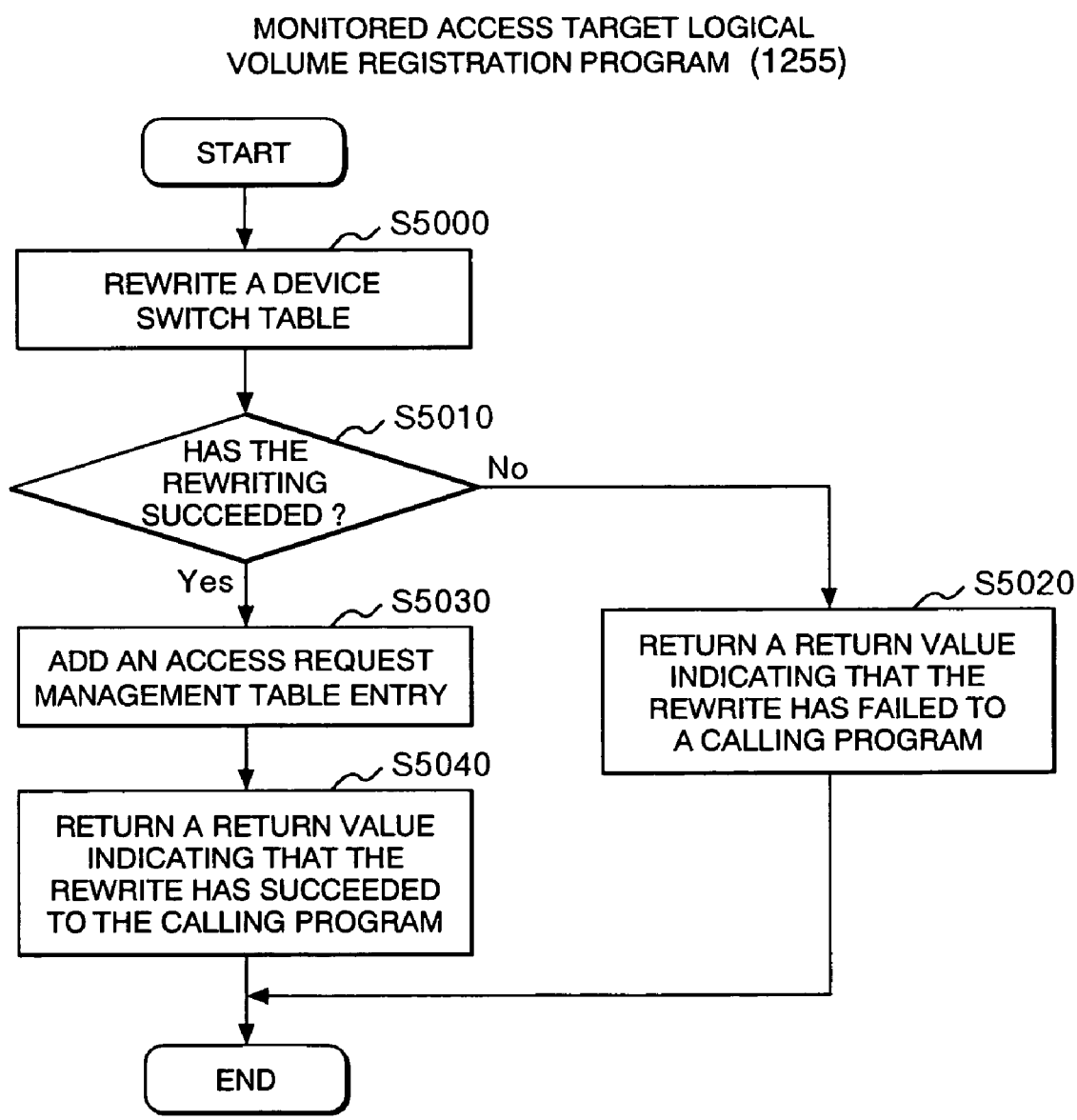
FIG. 6 is a process flow of a monitored access target logical volume registration program 1255 in the first embodiment.

In reference to FIGS. 6 to 11, flows of the programs structuring the access request monitoring program 1250 in the first embodiment are explained. FIG. 6 shows a process flow of the monitored access target logical volume registration program 1255. The monitored access target logical volume registration program 1255 calls a logical volume ID to be registered, as a parameter, by use of a system call or a command when the systems of the active and standby computers start. Next, the device switch table rewriting program 1240 is called to register the access request recording program 1270 in the device switch table entry 1211 for writing to the logical volume to be registered. Accordingly, when a write I/O request for the logical volume to be registered is made, the access request recording program 1270 is called (S5000).

Next, it is judged whether the device switch table entry 1211 has been successfully rewritten in step S5000. At this time, a result of the rewriting is expressed as a return value from the program for executing the rewrite. The flow goes to step S5030 when a return value indicating a successful rewrite, and the flow goes to step S5020 when a return value indicating a failed rewrite (S5010).

When a return value indicating a failed rewrite is returned in S5010, a return value indicating that the rewriting of the device switch table has failed is returned to a calling program to complete the monitored access target logical volume registration program 1255 (S5020). On the other hand, when a return value indicating a successful rewrite is returned in S5010, one access request management table entry 1310 is added to the access request management table 1300. At this time, an ID of a logical volume to be registered is set to the logical volume ID 1320 of the added entry, and the writing request counter 1330 is set to "0" (S5030). Finally, a return value indicating that the process has succeeded is returned to the calling program to complete the monitored access target logical volume registration program 1255 (S5040).

Figure 7:
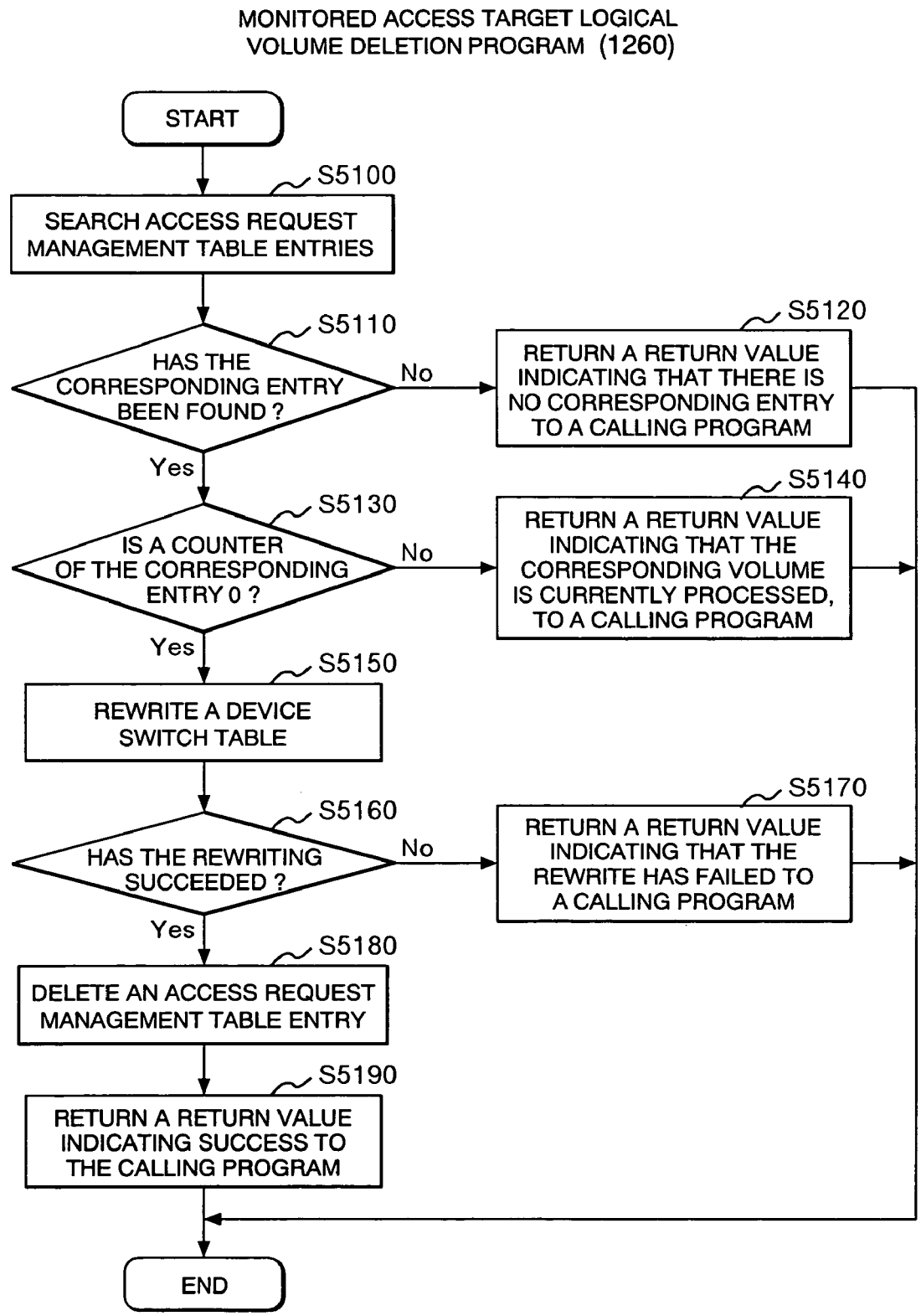
FIG. 7 is a process flow of a monitored access target logical volume deletion program 1260 in the first embodiment.

FIG. 7 shows a process flow of the monitored access target logical volume deletion program 1260 in the first embodiment. The monitored access target logical volume deletion program 1260 is called by a system call or a command by use of, as a parameter, an ID of a logical volume to be registered. First, in accordance with the ID as the parameter, the monitored access target logical volume deletion program 1260 searches, from the access request management table 1300, the access request management table entry 1310 corresponding to the logical volume ID (S5100).

It is judged whether the corresponding entry is found as a result of this search (S5110). When the entry is found, the flow goes to step S5130, and when the entry is not found, the flow goes to step S5120. When the corresponding entry is not found in step 5110, a return value indicating that the entry is not found is returned to a calling program to complete the monitored access target logical volume deletion program 1260 (S5120). On the other hand, when the entry is found, it is judged whether the write request counter 1330 of the entry is "0" When the counter 1330 is "0", the flow goes to S5150, and when the counter 1330 is not "0", the flow goes to S5140 (S5130).

When the write request counter 1330 is not "0" in step S5130, a return value indicating that the specified logical volume is under the I/O process is returned to the calling program, and the program is completed (S5140). On the other hand, when the write request counter 1330 is "0", the device switch table rewriting program 1240 is called to register the write process program 1360 in the device switch table entry 1211 corresponding to the write process for the specified logical volume. Therefore, when a write I/O request for a logical volume is made, the writing process program 1360 is called (S5150).

Next, it is judged whether the device switch table entry 1211 is successfully rewritten in step S5150 (S5160). A result of the rewriting is expressed as a return value from the program for executing the rewrite. When a return value indicating a successful rewrite is returned, the flow goes to step S5180, and when a return value indicating a failed rewrite is returned, the flow goes to step S5170. When a return value indicating a failed rewrite is returned, a return value indicating that the rewrite of the device switch table has failed is returned to the calling program to terminate the monitored access target logical volume deletion program 1260 (S5170). On the other hand, when a return value indicating a success rewrite is returned, the access request management table entry 1310 searched in step S5100 is deleted from the access request management table 1300 (S5180). Finally, a return value indicating that the monitored access target logical volume deletion program 1260 has succeeded is returned to the calling program to complete the monitored access target logical volume deletion program 1260 (S5190).

Figure 8:
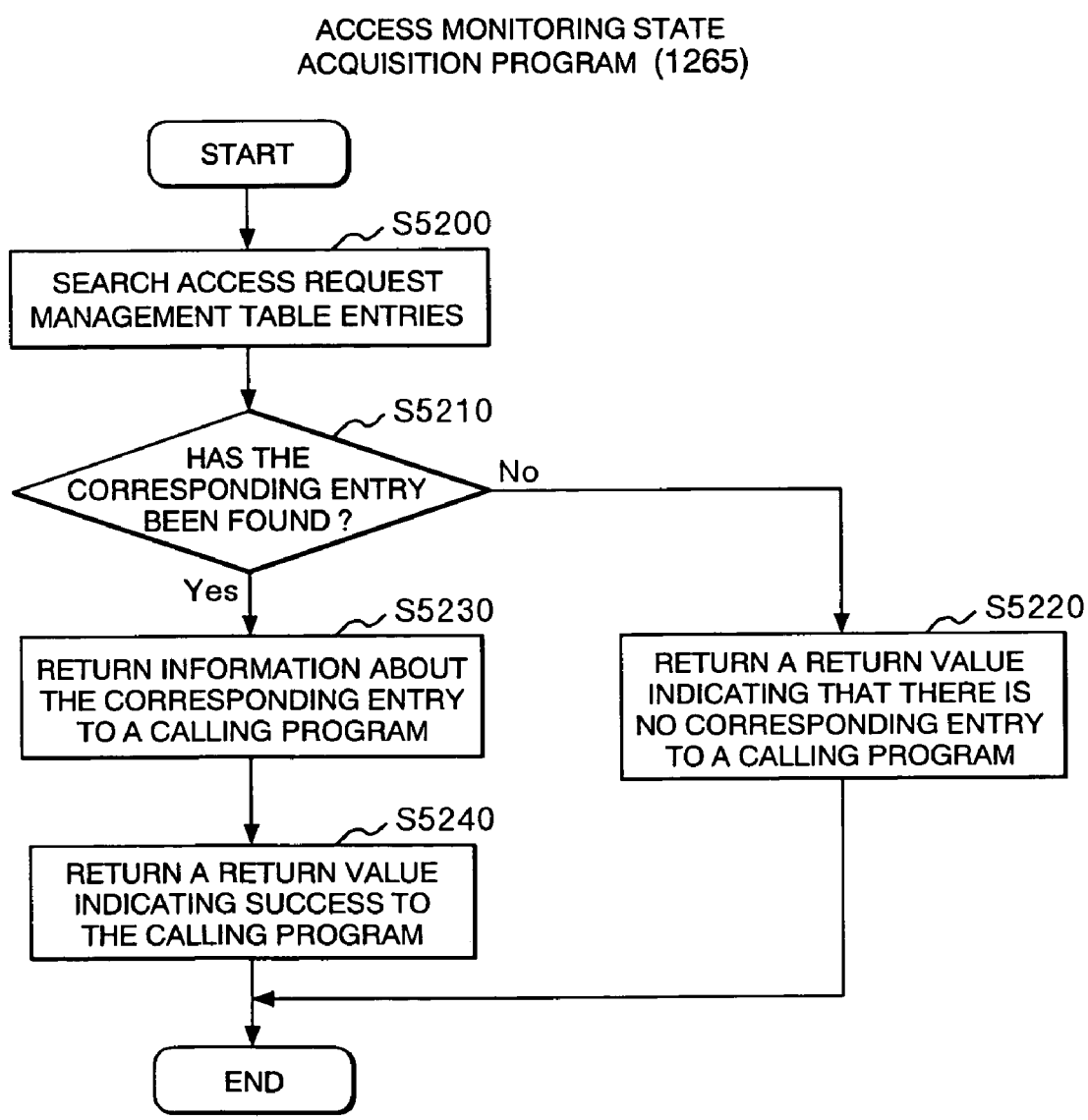
FIG. 8 is a process flow of an access request monitoring state acquisition program 1265 in the first embodiment.

FIG. 8 shows a process flow of the access monitoring state acquisition program 1265 in the first embodiment. The access monitoring state acquisition program 1265 is called by a system call or a command by use of, as a parameter, an ID of a logical volume to be acquired, or called internally from another program in the access monitoring program 1250. In addition to the logical volume ID, an additional parameter such as an address of a buffer in which information about the monitoring state is stored may be used.

First, in accordance with the logical volume ID delivered as a parameter, the access request management table entry 1310 corresponding to the logical volume ID is searched from the access request management table 1300 (S5200). Next, it is judged whether the corresponding entry is found as a result of the searching (S5210). When the corresponding entry is found, the flow goes to S5230, and when the entry is not found, the flow goes to step S5120. When the entry is not found, a return value indicating that there is no corresponding entry is returned to a calling program to complete the access monitoring state acquisition program 1265 (S5220). On the other hand, when the entry is found, information about the entry is returned to the calling program (S5230). At this time, when an address of a buffer is delivered as an additional parameter, the information may be stored in the buffer. Next, a return value indicating that the process of the access monitoring state acquisition program 1265 has succeeded is returned to the calling program to complete the access monitoring state acquisition program 1265 (S5240).

Figure 9:
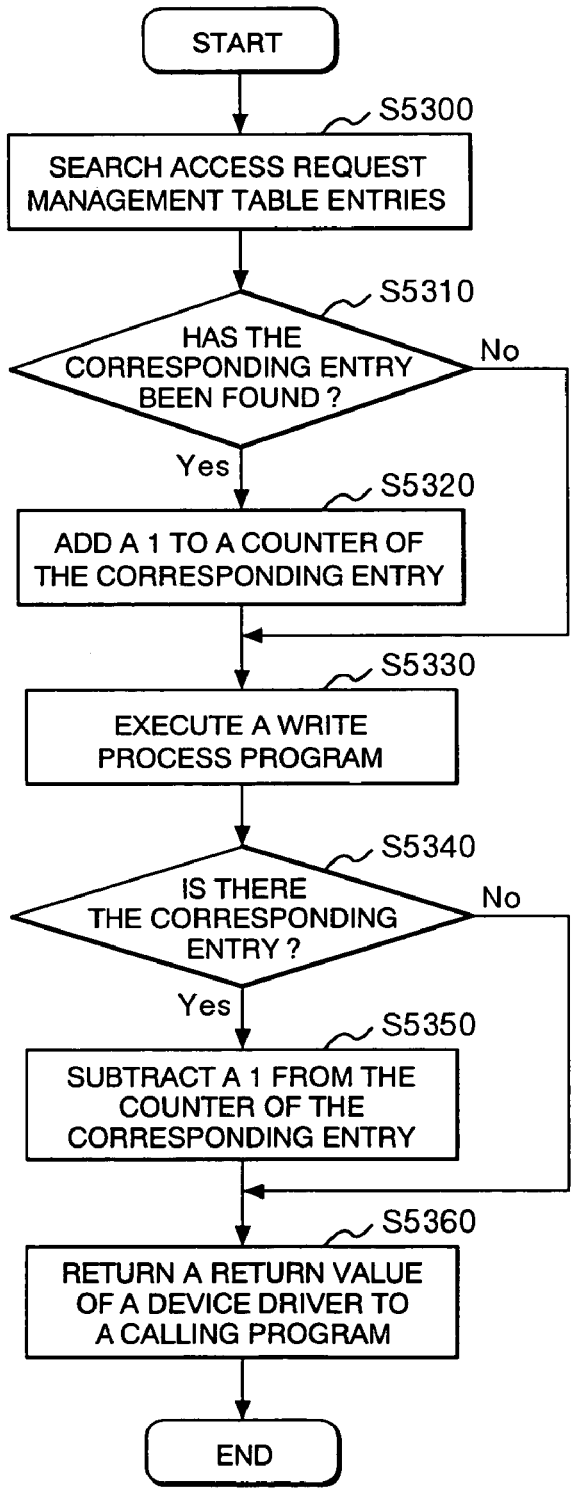
FIG. 9 is a process flow of an access request recording program 1270 in the first embodiment.

FIG. 9 shows a process flow of the access request recording program 1270 of the first embodiment. The access request recording program 1270, when an I/O request for a logical volume to be monitored is made, is called from the I/O request process program 1220 by use of parameters such as the logical volume ID and data used for the I/O.

First, in accordance with the logical volume ID delivered as a parameter, the access request management table entry 1310 corresponding to the logical volume ID is searched from the access request management table 1300 (S5300). It is judged whether the corresponding entry is found as a result of the searching (S5310). When the corresponding entry is found, the flow goes to step S5320, and when the corresponding entry is not found, the flow goes to step S5330. This step may be abbreviated.

When the corresponding entry is found in step 5310, "1" is added to a value of the write request counter 1330 of the access request management table entry 1310 searched in step S5300 (S5320).

Next, the write process program 1360 is called to execute an actual I/O process. At this time, the parameters delivered to the access request recording program 1270 is delivered to the write process program 1360 without modification. The write process program 1360 executes an actual I/O, and returns when completing the I/O (S5330). At this time, the write is executed for each physical volume corresponding to the target logical volume.

Next, it is judged whether the corresponding entry is found in the searching in step 5300 (S5340). When the corresponding entry is found, the flow goes to step S5350, and when the corresponding entry is not found, the flow goes to step S5360. This step may be abbreviated. When the corresponding entry is found in step S5340, "1" is subtracted from a value of the write request counter 1330. When a value of the write request counter 1330 becomes "0" as a result of the subtraction, the I/O process for the logical volume has been all completed (S5350). Finally, the return value returned from the device driver is returned to the calling program to complete the process of the access request recording program 1270 (S5360).

Figure 10:
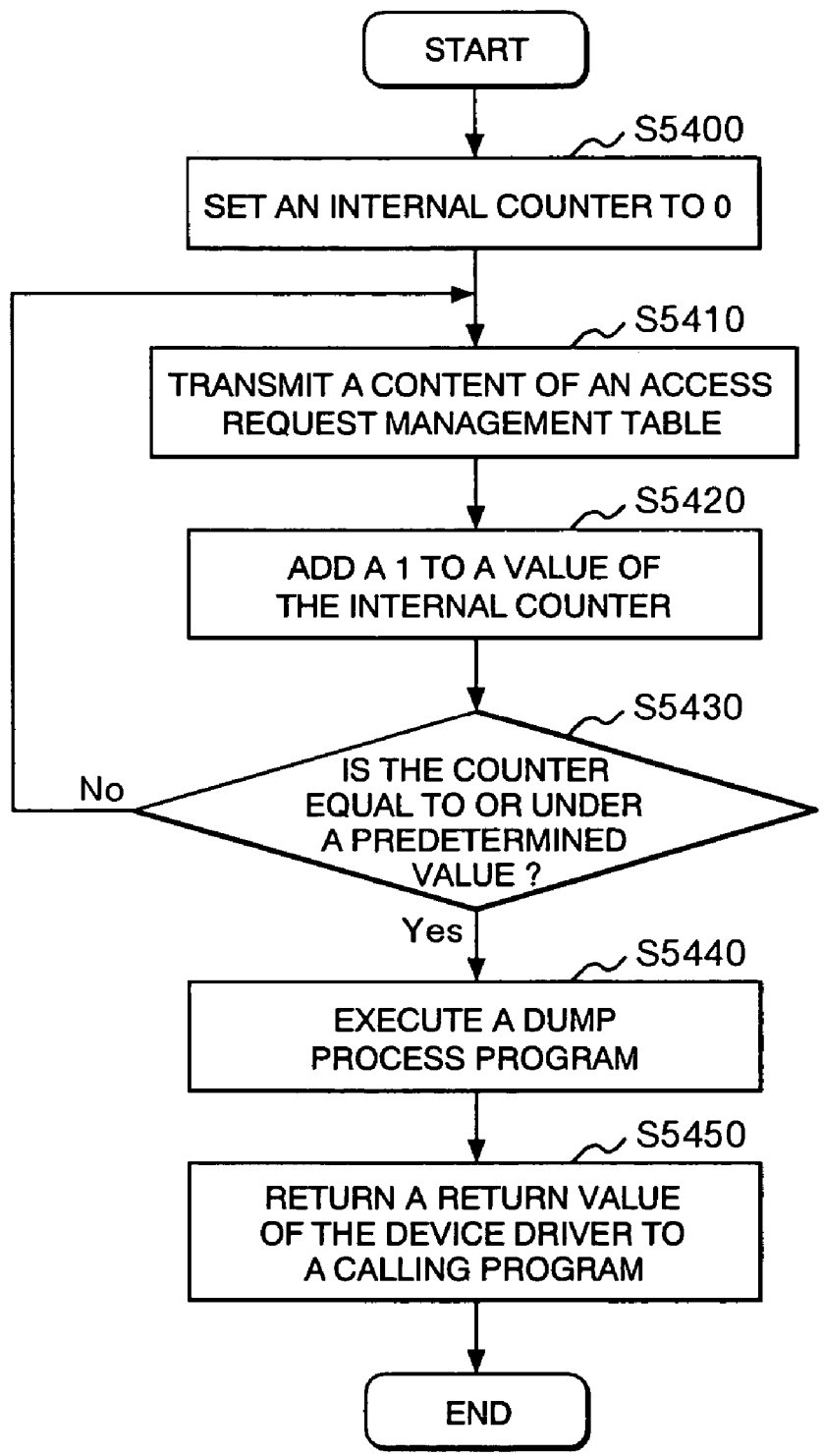
FIG. 10 is a process flow of an access record transmission program 1275 in the first embodiment.

FIG. 10 shows a process flow of the access record transmission program 1275 in the first embodiment. The access record transmission program 1275, when a failure occurs, is called from the failure detection program 1230.

First, a value of an internal counter used in the access record transmission program 1275 is set to "0" (S5400). Next, a content of the access request management table 1300 is transmitted to the system switching control program 2100 of the standby computer 2000 via the network 4000 (S5410). At this time, the transmission is executed using the communications adaptor 1550 via the IOP 1500. This process may be executed by an external program. Next, "1" is added to the value of the internal counter (S5420).

Next, it is judged whether a value of the internal counter reaches a predetermined value (S5430). When a value of the internal counter reaches a predetermined value, the flow goes to step S5440, and when a value of the internal counter does not reach a predetermined value, the flow goes to step S5410.

In this judgment, when a value of the internal counter reaches a predetermined value, the dump process program 1370 is called. The dump process program 1370 executes a dump process to return a result of the dump process as a return value (S5440). The return value of the dump process program 1370 is returned to a calling program to complete the access record transmission program 1275 (S5450).

Figure 11:
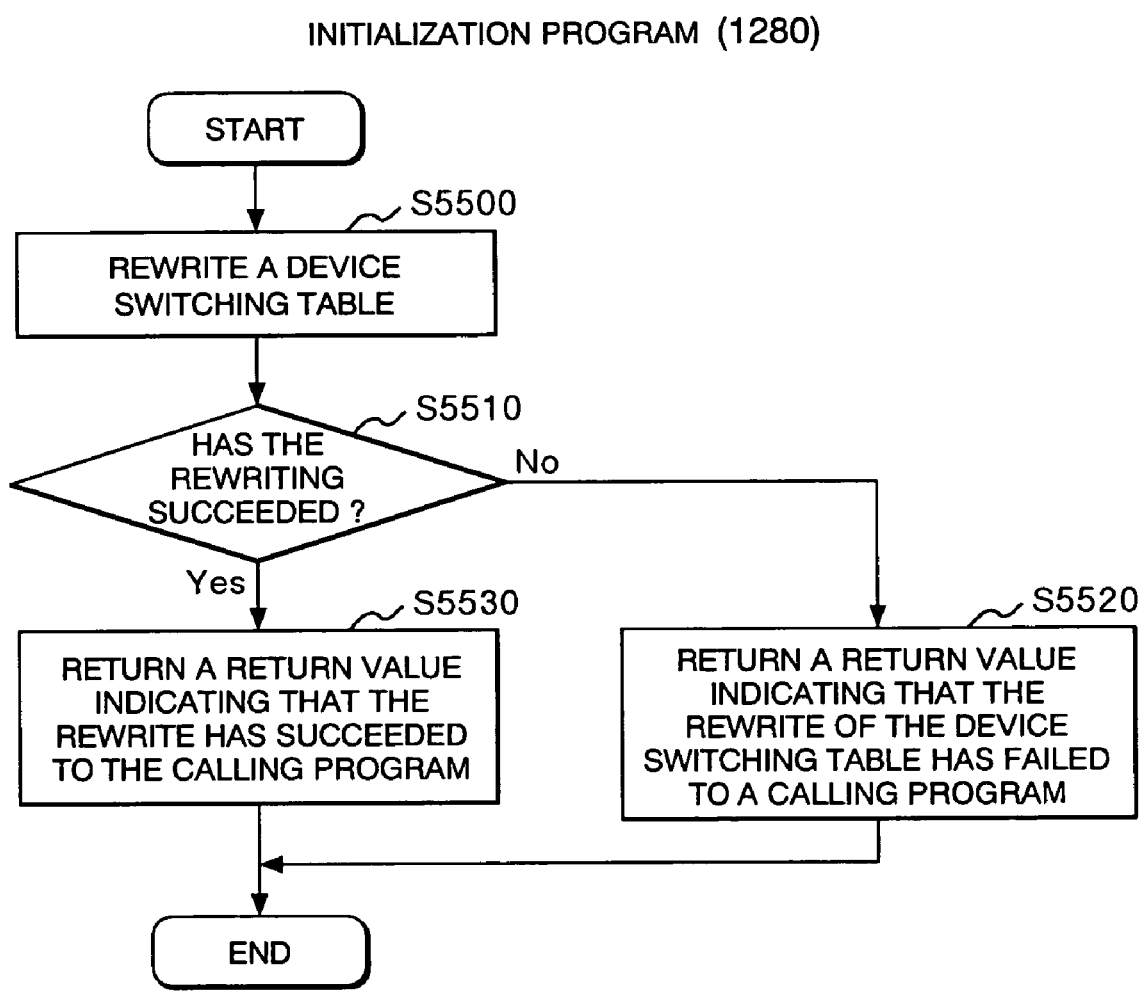
FIG. 11 is a process flow of an initialization program 1280 in the first embodiment.

FIG. 11 shows a process flow of the initialization program 1280 in the first embodiment. The initialization program 1280, when the system starts, is called from the system switching control program 1100 by use of, as a parameter, an ID of a logical volume to be dumped. An additional parameter other than the ID may be used.

First, the device switch table rewriting program 1240 of the OS 1200 is called to register an address of the access record transmission program 1275 in the device switch table 1212 corresponding to a dump process for a specified logical volume. Accordingly, when a failure occurs to make a dump request for the logical volume, the failure detection program 1230 calls the access record transmission program 1275 (S5500).

Next, it is judged whether the process in step S5500 succeeds (S5510). When the process succeeds, the flow goes to step S5530, and when the process fails, the flow goes to step S5520. In other words, when the rewrite fails in step S5510, a return value indicating that the rewriting of the device switch table has failed is called, and returned to the calling program. Then, the initialization program 1280 completes its process (S5530).

Figure 12:
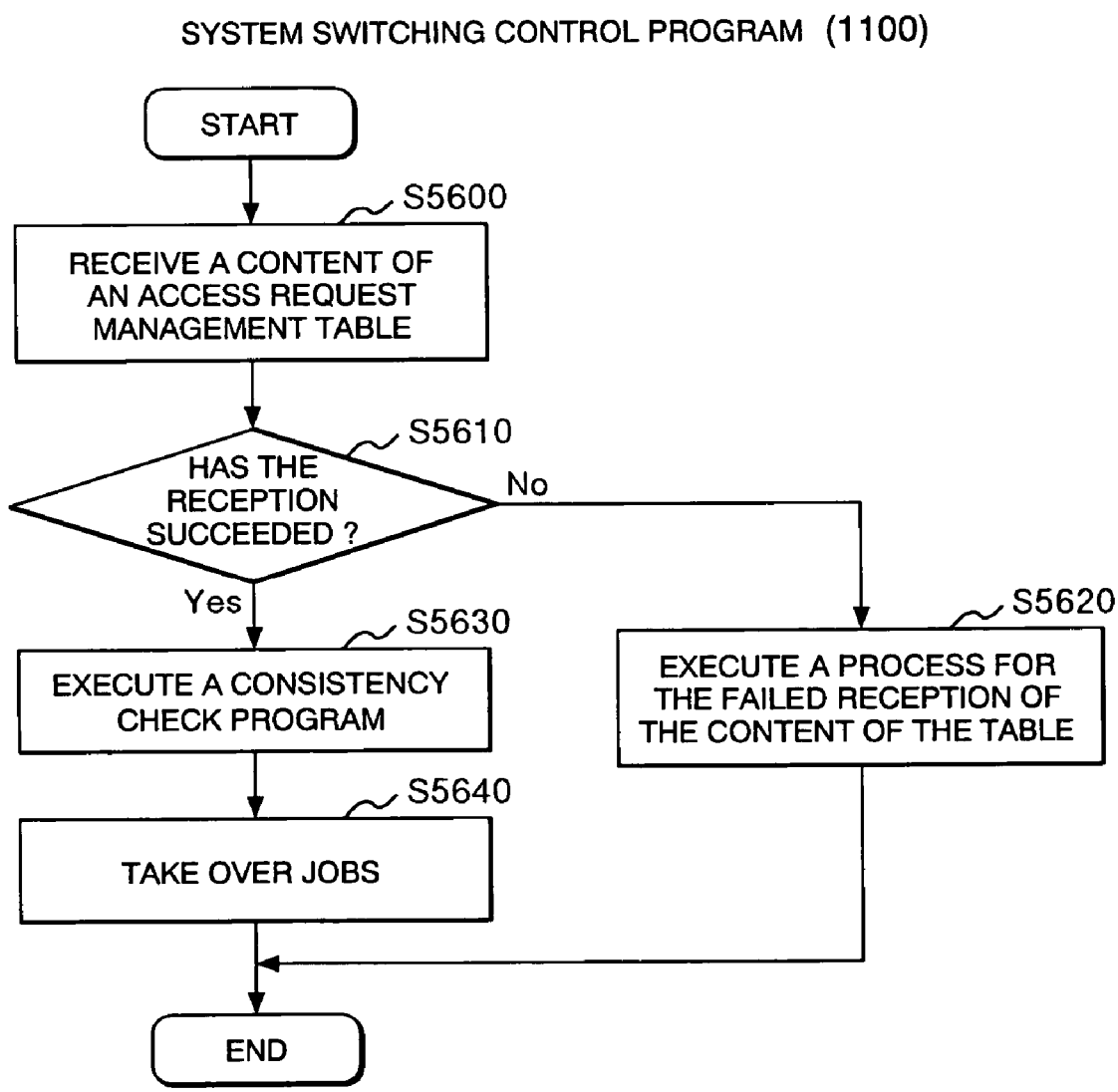
FIG. 12 is a process flow of a system switching control program 1100 in the first embodiment.

FIG. 12 shows a process flow of the system switching control program 1100 in the first embodiment. In the following, the system switching control program 2100 of the standby computer 2000 is explained. The system switching control program 2100 monitors failures of the active computer 1000, and causes the standby computer 2000 to take over jobs of the active computer 1000 when a failure occurs.

First, a content of the access request management table 1300 transmitted from the access record transmission program 1275 of the active computer 1000 is received (S5600). Next, it is judged whether the reception in step S5600 has succeeded (S5610). When the reception has succeeded, the flow goes to step S5630, and when the reception has failed, the flow goes to step S5620.

When the reception is judged to have failed in step 5610, a process for the reception failure is executed (S5620). The jobs may be taken over in a state of the reception failure. On the other hand, when the reception is judged to have succeeded, the consistency check program 2150 of the standby computer 2000 is called to check consistency (S5630). At this time, the content of the access request management table 1300 received in step S5600 is delivered to the consistency check program 2150 as a parameter. An additional parameter other than the access request management table 1300 may be used. Finally, the standby computer 2000 takes over the jobs as a new active computer (S5640).

Figure 13:
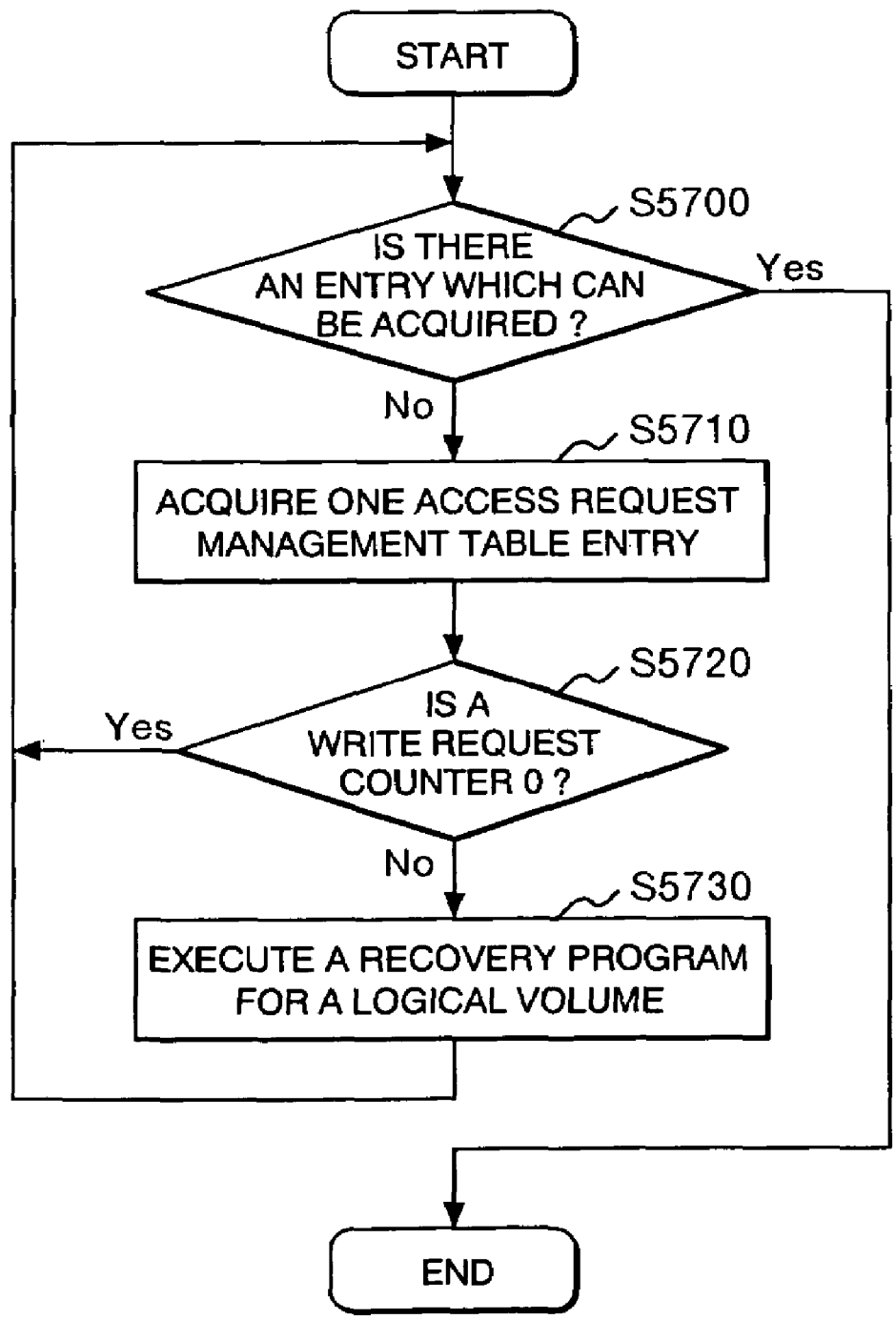
FIG. 13 is a process flow of a consistency check program 1150 in the first embodiment.

FIG. 13 shows a process flow of the consistency check program 2150 of the standby computer 2000 in the first embodiment. The consistency check program 2150 is called from the system switching control program 2100 when the system is switched. At this time, a content of the access request management table 1300 is received as a parameter from the access record transmission program 1275 of the active computer 1000. An additional parameter other than that content may be used.

First, it is judged whether the access request management table entry 1310 which can be acquired exists in the access request management table 1300 received as a parameter. All the entries are searched and judged as mentioned above (S5700). When the corresponding entry exists, the flow goes to step S5710, and when the corresponding entry does not exist, the consistency check program 2100 completes its process. When the access request management table entries 1300 which can be acquired exist, one entry is acquired (S5710). It is judged whether a value of the write request counter 1330 of the acquired entry is "0" (S5720).

When the value is "0" as a result of the judgment, a write I/O is all completed in a logical volume corresponding to the entry, and thus a recovery program does not need to be executed. Therefore, the flow goes to step S5700 without executing the recovery program. On the other hand, when the value is not "0", a logical volume corresponding to the entry may be currently processed, an interrupted write I/O may exist, and there may be inconsistency in the logical volume. Then, the flow goes to step S5730 to execute the recovery program for the logical volume.

When the value of the write request counter 1330 is judged not to be "0" in step S5720, the recovery program is executed for the corresponding logical volume. As a result, when there may be inconsistency in the logical volume, part or all of physical volumes is copied to other physical volumes to recover the inconsistency. After the execution of the recovery program, the flow goes to step S5700 (S5730).

Figure 14:
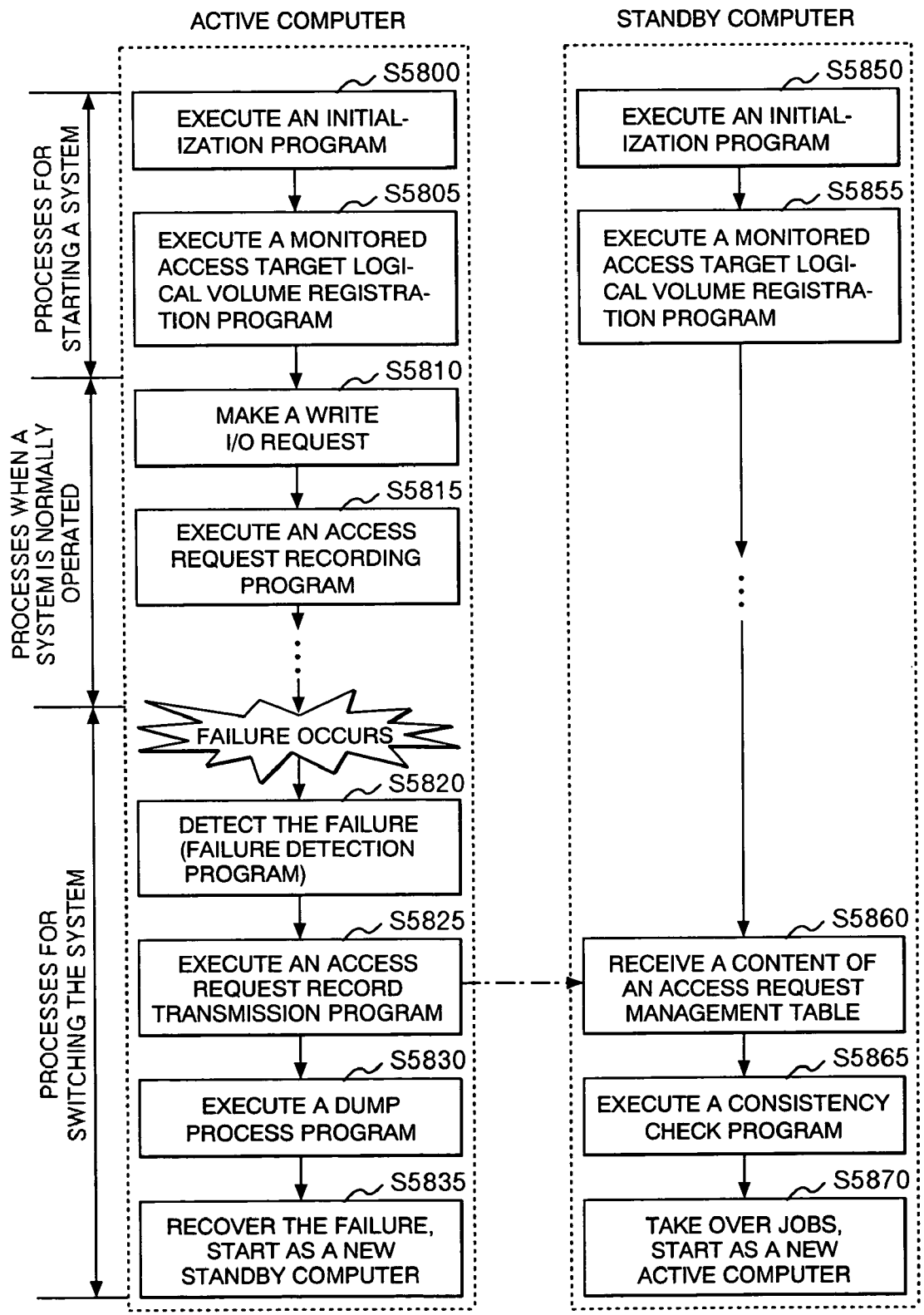
FIG. 14 is a flow of hot standby processing in the first embodiment.

FIG. 14 shows a flow of a hot standby process in the first embodiment. First, the processes when the active computer starts are executed. The active computer 1000 calls and executes the initialization program 1280 when the system starts (S5800). As a result, the device switch table entry 1212 is rewritten to be set so that the access request record transmission program 1275 is called in case of a dump process.

Next, the monitored access target logical volume registration program 1255 is called and executed (S5805). As a result, the device switch table entry 1211 is rewritten to be set so that the access request recording program 1270 is called when a write I/O request for a logical volume is made. When there are a plurality of logical volumes accessed under monitoring, this step is executed for each logical volume.

Next, the processes when the active computer 1000 is normally operated are executed. When the application program 1050 issues a write I/O request to a logical volume, the I/O request process program 1220 of the OS 1200 is called and executed (S5810). The I/O request process program 1220 refers to a content of the device switch table entry 1211 in accordance with a logical volume to which an I/O is executed and with its process content.

Next, the I/O request process program 1220 calls and executes the access request recording program 1275 registered to the device switch table program entry 1211 (S5815). The access request recording program 1275 executes the following processes (1) to (3).

(1) "1" is added to the write request counter 1330 of the access request management table entry 1310 corresponding to the logical volume of the I/O target.

(2) The write process program 1360 of the device driver 1350 is called to execute an actual I/O. At this time, the same write is executed for physical volumes corresponding to the target logical volume.

(3) After "1" is subtracted from the value of the write request counter 1330 operated in (1), the I/O completion is notified to the application program 1050 which is a calling program. Steps S5810, S5815 are repeated until a failure occurs in the active computer 1000.

When a failure occurs in the active computer 1000, the system switching is executed. In other words, when a failure occurs in the active computer 1000, the failure detection program 1230 detects the failure. The failure detection program 1230 refers to the device switch table entry 1212 corresponding to a dump process for a previously registered logical volumes so that an address of a program registered to the entry is acquired (S5820).

Next, the failure detection program 1230 calls the program having the address acquired in step S5820. Then, the access request record transmission program 1275 is called and executed (S5825). The access request record transmission program 1275 transmits a content of the access request management table 1300 to the system switching control program 2100 of the standby computer 2000.

Next, the failure detection program 1230 calls and executes the dump process program 1370 (S5830). As a result, a memory in the system is dumped to a logical volume. When the memory dump is completed, the active computer 1000 recovers the failure to start as a new standby computer. At this time, processes after step S5850 described below are executed (S5835).

On the other hand, the system starts in the standby computer 2000. In the standby computer 2000, the initialization program 2280 is called and executed when the system starts (S5850). As a result, the device switch table entry 2212 of the OS 2200 is rewritten to be set so that the access request record transmission program 2275 is called in case of a dump process.

Next, the monitored access target logical volume registration program 2255 is called and executed (S5855). As a result, the device switch table entry 2211 of the OS 2200 is rewritten to be set so that the access request recording program 2270 is called when a write I/O request for a logical volume is made. When there are a plurality of logical volumes accessed under monitoring, this step is executed for each logical volume. After the completion of the above processes, the system switching control program 2100 of the standby computer 2000 waits a transmission of a content of the access request management table 1300 from the access record transmission program 1275.

Next, system switching is executed in the standby computer 2000 when a failure occurs. The system switching control program 2100 of the standby computer 2000 receives a content of the access request management table 1300 transmitted from the active computer 1000 (S5860). By use of, as a parameter, the received content of the access request management table 1300, the consistency check program 2150 is called and executed (S5865). In other words, the consistency check program 2150, in accordance with the content of the access request management table 1300 delivered as a parameter, checks consistency of a logical volume. At this time, when there is an interrupted write I/O in the logical volume, a recovery program is executed for the logical volume. In the recovery program, an area in which the interrupted I/O is to be executed is copied to another physical volume to recovery the inconsistency. All the areas corresponding to the logical volume may be copied. After the completion of the above processes, the system switching control program 2100 takes over jobs, and restart the jobs as a new active computer (S5870).

Second Embodiment

Referring to FIGS. 15 to 22, a second embodiment is explained. A difference between the first and second embodiments is that an access request monitoring program of an active computer notifies every write I/O request issued by an application of the active computer to an access request monitoring program of a standby computer before and after the I/O execution, and that the access request monitoring program of the standby computer records the notifications in an access request management table.

Figure 15:
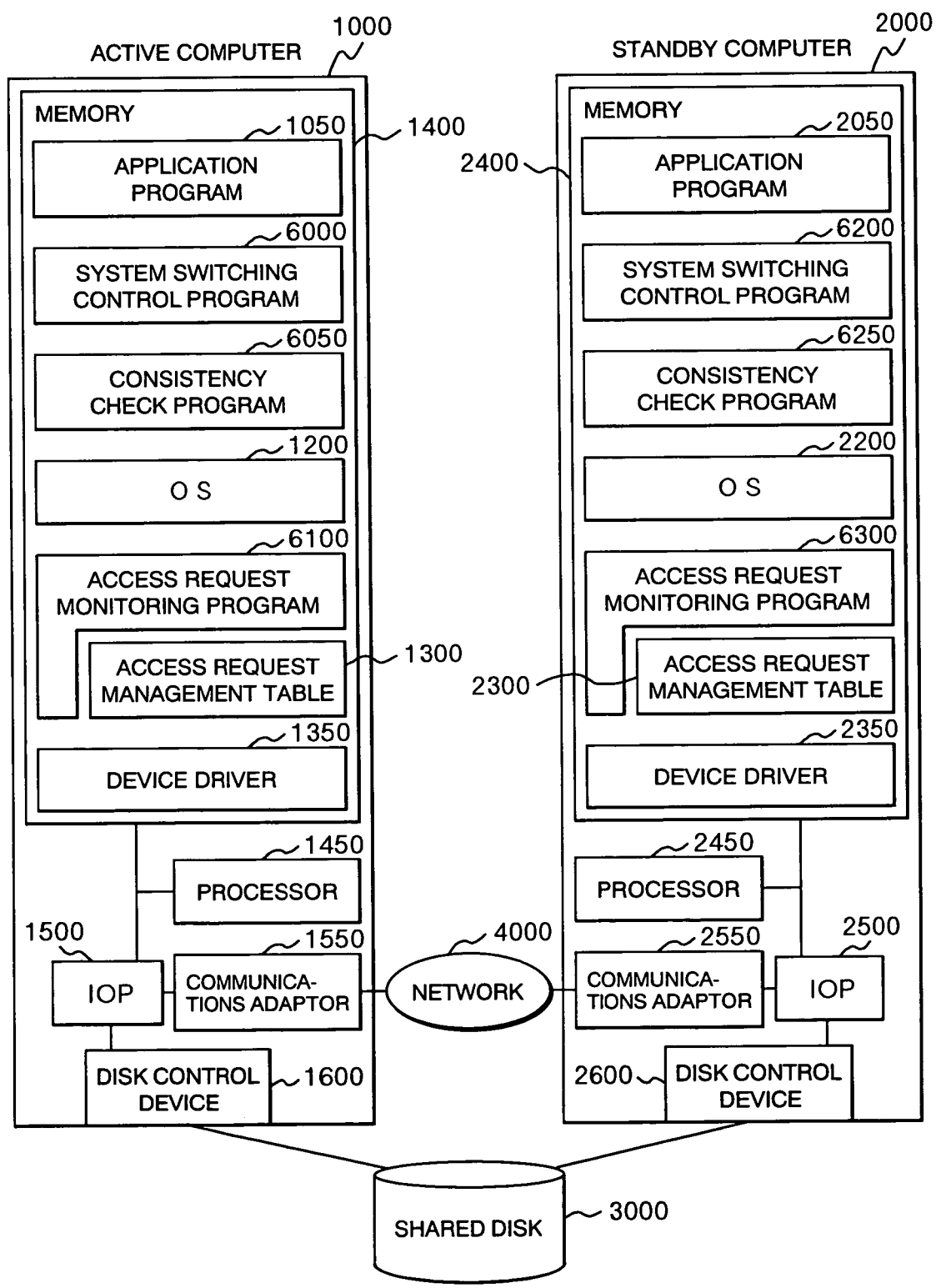
FIG. 15 is an overview block diagram of a hot standby system in a second embodiment.

FIG. 15 shows a structure of a computer system of the second embodiment. Because components of the structure other than system switching control programs 6000, 6200, consistency check programs 6050, 6250, and access request monitoring programs 6100, 6300 are the same as the first embodiment, the same components are not explained in the following. Because a structure of the components 6200 to 6300 of the standby computer 2000 is the same as the components 6000 to 6100 of the active computer 1000, only the components of the active computer 1000 are explained.

Figure 16:
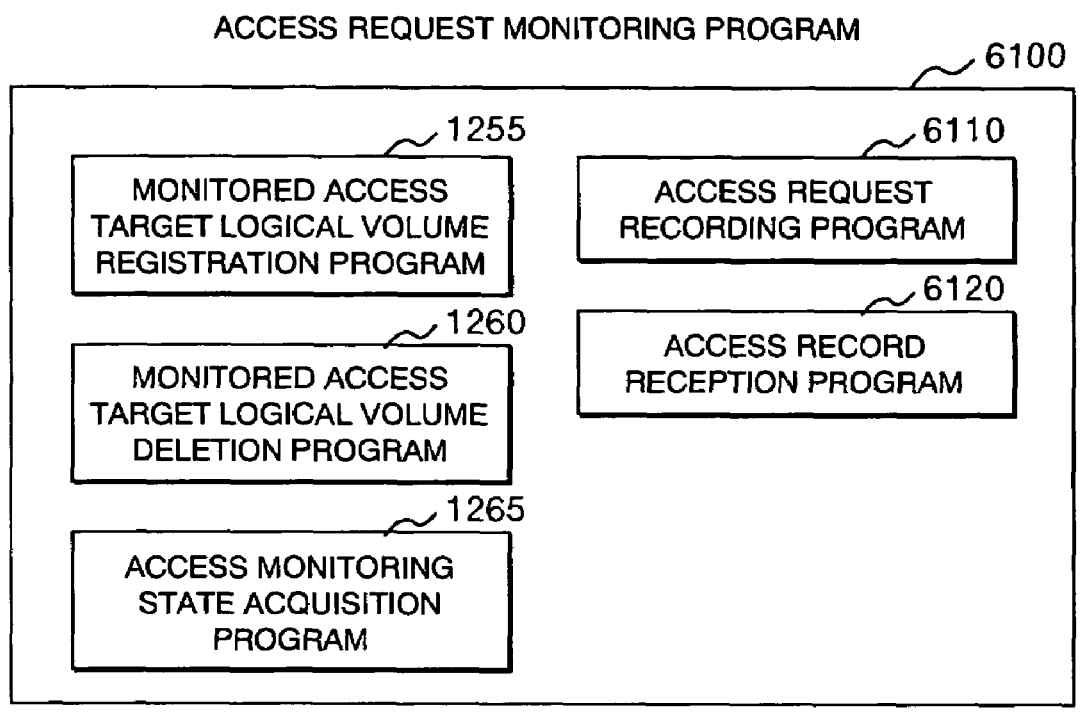
FIG. 16 is a block diagram of an access request monitoring program 6100 in the second embodiment.

FIG. 16 shows a structure of the access request monitoring program 6100 of the second embodiment. The access request monitoring program 6100 includes the monitored access target logical volume registration program 1255, the monitored access target logical volume deletion program 1260, the access monitoring state acquisition program 1265, an access request recording program 6110, and an access request record reception program 6120. The monitored access target logical volume registration program 1255 and the access monitor state acquisition program 1265 may be not included. Because structures and processes of the programs 1255 to 1265 are the same as the first embodiment, they are not explained.

Figure 17:
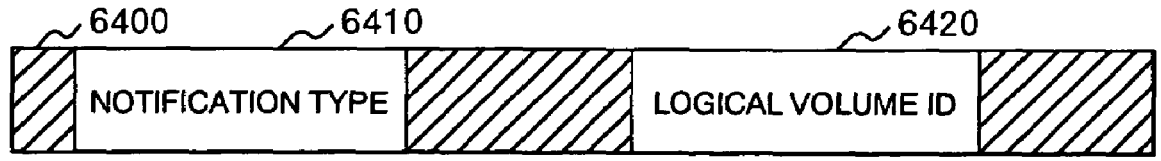
FIG. 17 is a block diagram of an access request notification packet 6400 in the second embodiment.

FIG. 17 shows a structure of an access request notification packet 6400 transmitted to the standby computer when a write I/O request is made in the active computer 1000 of the second embodiment. The access request notification packet 6400 includes a notification type 6410 for indicating a content of a notification, and a logical volume ID 6420 of a logical volume to be accessed. The notification type 6410 stores a value indicating a type of a notification to the standby computer, the value indicating "a start of a write I/O" or "a completion of a write I/O". The logical volume ID 6420 stores a logical volume ID for identifying a logical volume in which a write I/O is to be executed.

When a write I/O request is made in the active computer, and the access request recording program 6110 is called, the access request recording program 6110 produces the access request notification packet 6400, and transmits it to the access record reception program 6320.

Figure 18:
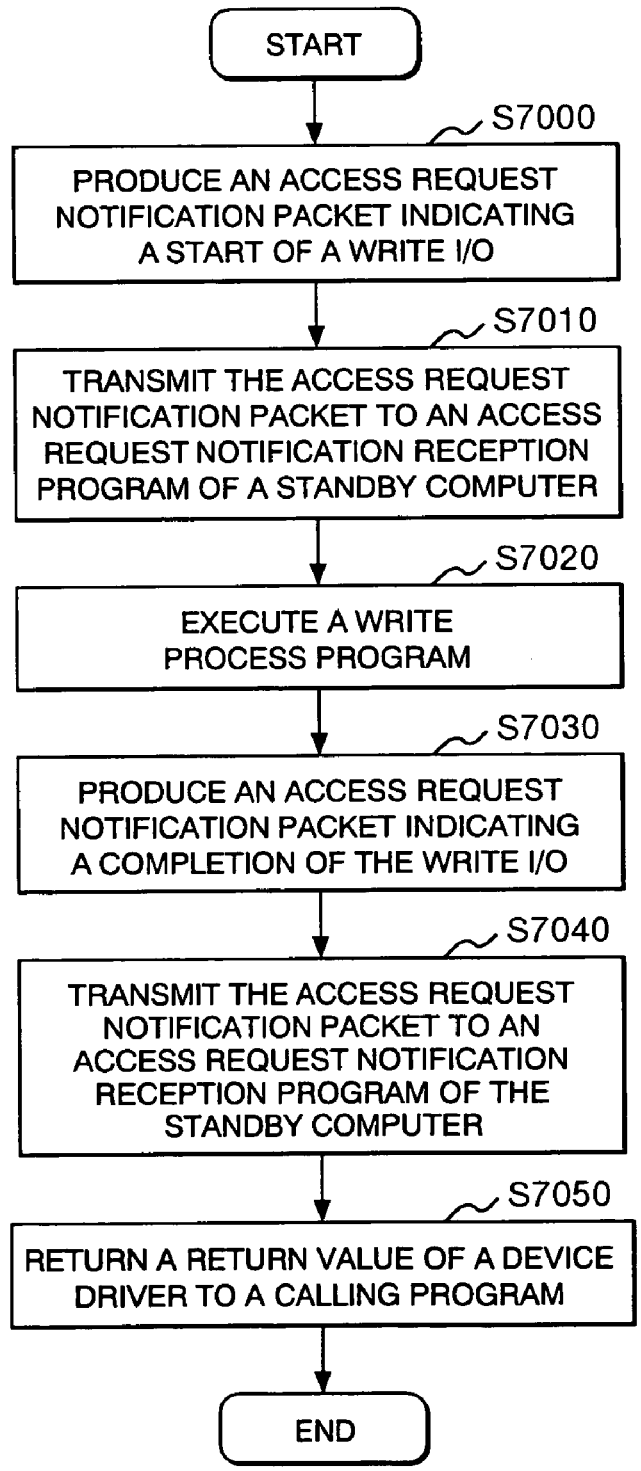
FIG. 18 is a process flow of an access request recording program 6110 in the second embodiment.

FIG. 18 shows a process flow of the access request recording program 6110 of the second embodiment. Like in the first embodiment, the access request recording program 6110, when a write I/O for the shared disk 3000 is made, is called from the I/O request process program 1220 by use of, as a parameter, data used for a logical volume ID and an I/O.

First, the access request notification packet 6400 indicating a start of a write I/O is produced (S7000). At this time, the notification type 6410 stores a value indicating "a start of a write I/O", and the logical volume ID 6420 stores an ID of a logical volume for which an I/O is to be executed.

Next, the access request notification packet 6400 is transmitted to the access record reception program 6320 of the standby program via the network 4000 (S7010). In this case, the transmission is executed via the IOP 1500 by use of the communications adaptor 1550. This process may be executed by an external program. Next, the write process program 1360 is called to execute an actual I/O (S7020). At this time, the parameter which the I/O request process program 1220 delivers to the access request recording program 6110, is delivered, without modification, to the write process program 1360. The write process program 1360 executes an actual I/O, completes its process when the I/O is completed, and returns.

Next, the access request notification packet 6400 indicating a completion of the write I/O is produced (S7030). In this case, the notification type 6410 stores a value indicating "a completion of a write I/O", and the logical volume ID 6420 stores an ID of a logical volume for which an I/O is to be executed. The access request notification packet 6400 produced as described above is transmitted to the access record reception program 6320 of the standby computer via the network 4000 (S7040). The transmission is executed via the IOP 1500 by use of the communications adaptor 1550. This process may be executed by an external program.

Finally, a return value returned from the write process program 1360 is called, and returned to a calling program to complete the process of the access request recording program 6110 (S7050).

Figure 19:
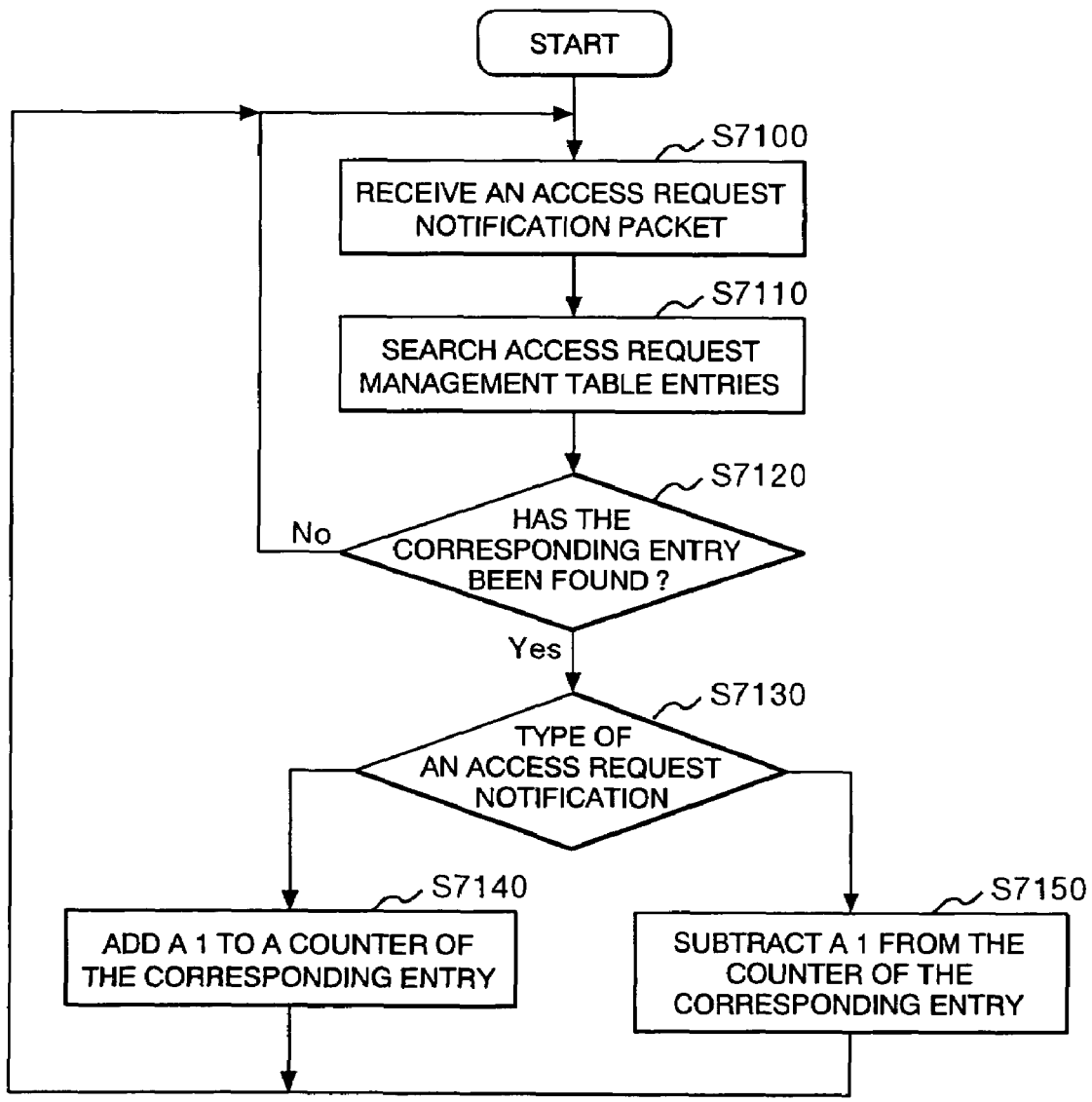
FIG. 19 is a process flow of an access request reception program 6120 in the second embodiment.

FIG. 19 shows a process flow of the access request reception program 6120. The access request reception program 6120 always waits, on the standby computer 2000 normally operated, the access request notification packet 6400, and executes its process when the access request notification packet 6400 arrives. In the following, the access record reception program 6320 of the standby computer 2000 is explained.

First, the access request notification packet 6400 is received from the access request recording program 6110 of the active computer 1000 (S7100). Next, in accordance with a content of the logical volume ID 6420 of the access request notification packet 6400 received in step S7100, the access request management table entry 2310 is searched (S7110).

It is judged whether the corresponding entry is found as a result of the search (S7120). When the corresponding entry is found, the flow goes to step S7130. When the corresponding entry is not found, it is judged that an entry to be executed is not found, and the flow goes to step 7100. When the corresponding entry is found in step S7120, a content of the notification type 6410 of the access request notification packet 6400 received in step S7100 is judged (S7130). When the content indicates "a start of a write I/O", "1" is added to a value of the write request counter 2330 of the access request management table entry 2310 searched in step S7110, and the flow goes to step 7100 (S7140).

On the other hand, when the notification type 6410 indicates "a completion of a write I/O" as a result of the judgment in step S7130, "1" is subtracted from a value of the write request counter 2330 of the access request management table entry 2310 searched in step S7110, and the flow goes to step 7100 (S7150).

Figure 20:
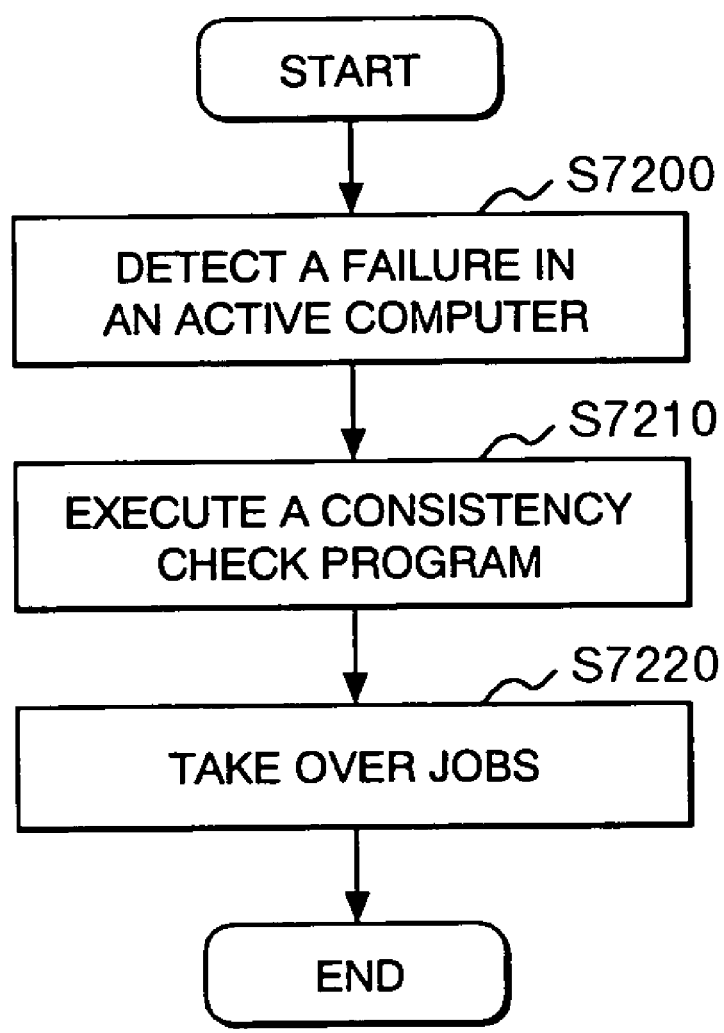
FIG. 20 is a process flow of a system switching control program 6000 in the second embodiment.

FIG. 20 shows a process flow of the system switching control program 6000 of the second embodiment when a failure occurs. The system switching control program 6000 of the standby computer 2000 always monitors failures of the active computer 1000 normally operated, and executes system switching when detecting a failure. In the following, the system switching control program 6200 of the standby computer 2000 is explained.

First, the system switching control program 6200 of the standby computer 2000 detects failure occurrences in the active computer 1000 (S7200). At this time, a conventional technique such as an ALIVE message is used as means for detecting failures. Next, the consistency check program 6250 is called to check consistency of logical volumes structuring the shared disk 3000 (S7210). At this time, a group of IDs of the logical volumes is delivered to the consistency check program 6250 as parameters. The consistency check program 6250, after a completion of the check, completes its process and returns.

When the consistency check program 6250 completes its process, the standby computer 2000 is caused to take over jobs. After this step, the standby computer 2000 restarts the jobs as a new active computer (S7220).

Figure 21:
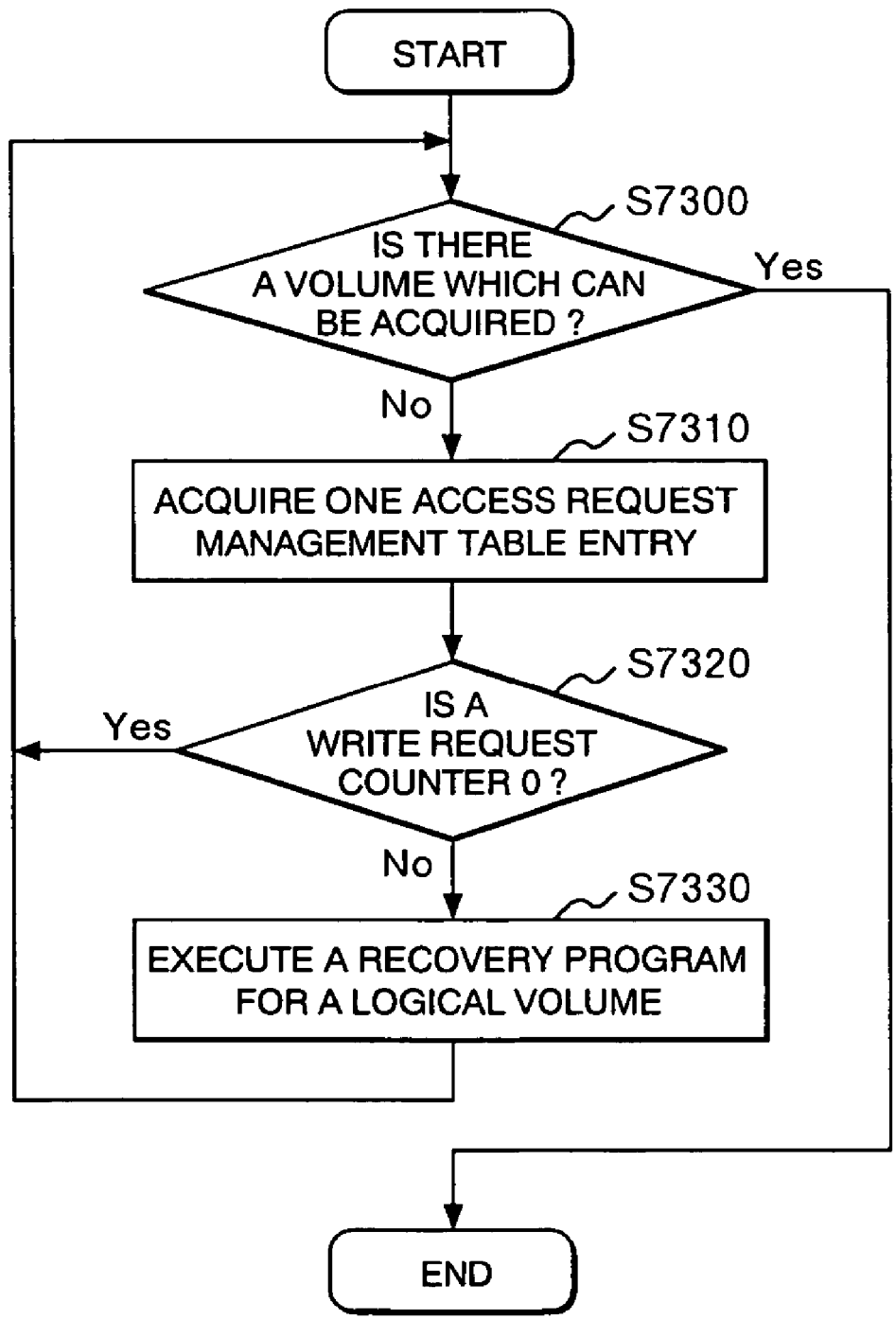
FIG. 21 is a process flow of a consistency check program 6250 in the second embodiment.

FIG. 21 shows a process flow of the consistency check program 6250 of the standby computer 2000 of the second embodiment. The consistency check program 6250, during a process of the system switching, is called from the system switching control program 6200. At this time, a row of IDs of logical volumes to be monitored is received. An additional parameter other than the row may be used.

First, it is judged whether there is a logical volume ID which can be acquired (S7300). When there is a logical volume ID which can be acquired, the flow goes to S7310. When there is no logical volume ID which can be acquired, the process of the consistency check program 6250 is completed. When there is a logical volume ID which can be acquired, one entry is acquired to check the access request management table entry 2310 corresponding to the ID (S7310). At this time, the acquired logical volume ID is deleted from the row received as the parameter.

Next, it is judged whether a value of the write request counter 2330 of the acquired access request management table entry 2310 is "0" (S7320). When the value is "0", a write I/O for a logical volume corresponding to the entry has been fully completed, thus a recovery program is unnecessary. Therefore, the flow goes to step S7300 without executing the recovery program. On the other hand, the value is not "0", an write I/O for the logical volume corresponding to the entry has been interrupted, and thus inconsistency may exist in the logical volume. In this case, the recovery program is executed for the logical volume (S7330). As a result, the consistency in the logical volume is recovered. After the execution of the recovery, the flow goes to step 7300.

Figure 22:
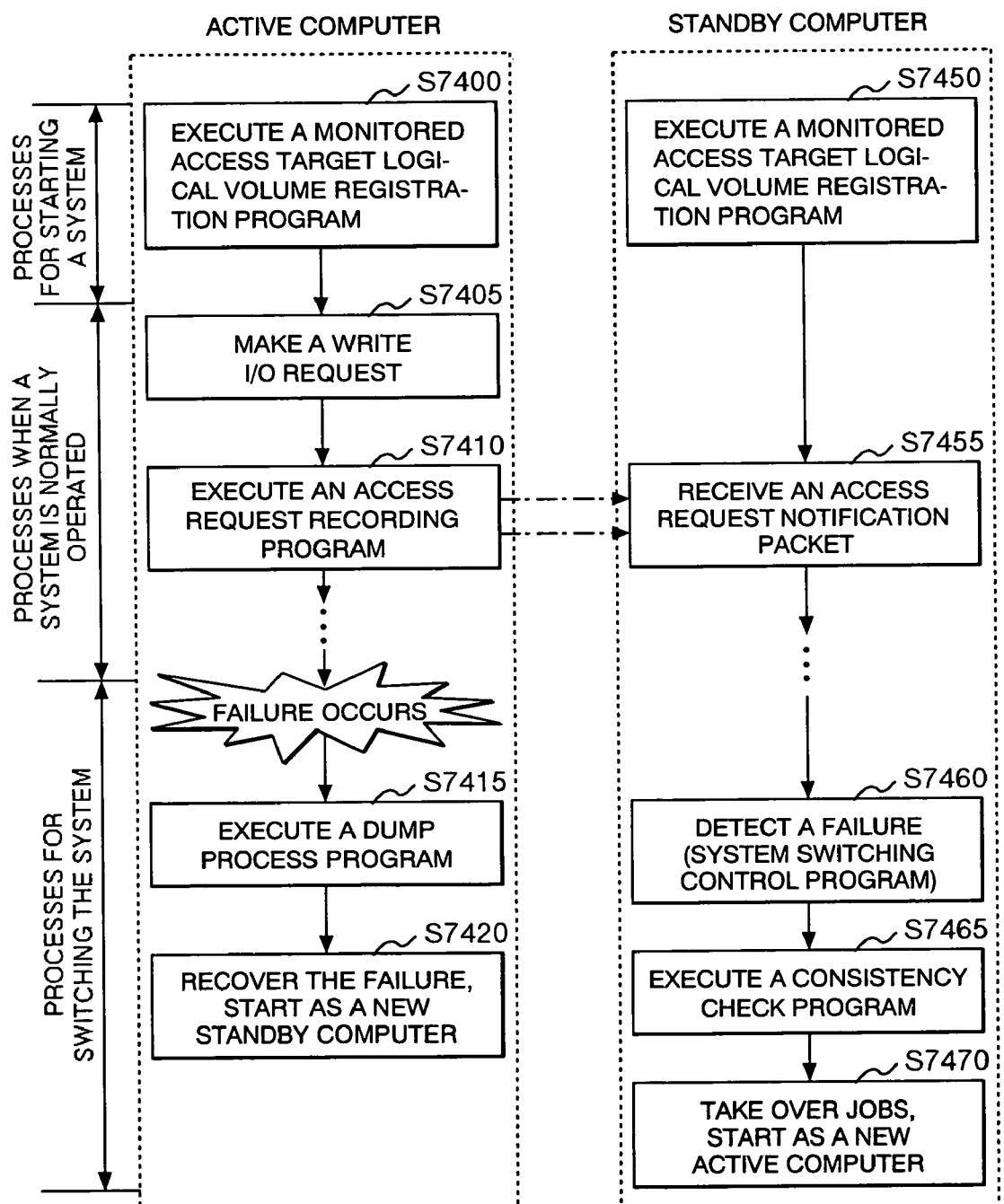
FIG. 22 is a flow of hot standby processing in the second embodiment.

FIG. 22 shows an overview flow of a hot standby process of the second embodiment.

First, the processes when the system of the active computer 1000 starts are executed. When starting the system, the active computer 1000 calls and executes the monitored access target logical volume registration program 1255. As a result, the device switch table entry 1211 of the OS 1200 is rewritten to be set so that the access request recording program 6110 is called when a write I/O request for a logical volume is made. When there are a plurality of logical volumes to be accessed under monitoring, this process is executed for each logical volume (S7400).

Next, processes of the active computer 1000 normally operated are executed. When the application program 1050 issues a write I/O request to a logical volume, the I/O request process program 1220 is called and executed. The I/O request process program 1220, in accordance with a logical volume for which an I/O is to be executed and with a content of the process, refers to a content of the device switch table entry 1211 (S7405).

Next, the I/O request process program 1220 calls and executes the access request recording program 6110 registered in the referenced device switch table entry 1211. The access request recording program 6110 executes the following processes (1) to (3). The process (2) is executed for each of physical volumes corresponding to a logical volume for which the I/O is to be executed. The access request notification packet 6400 indicating "a start of an I/O" is transmitted to the access request notification reception program 6120 of the standby computer 2000. The write process program 1360 of the device driver 1350 is called to execute an actual I/O. After the access request notification packet 6400 indicating "a completion of an I/O" is transmitted to the access request notification reception program 6120 of the standby computer 2000, the completion of the I/O is notified to the calling application 1050. These steps S7405, S7410 are repeated until a failure occurs in the active computer (S7410).

In this state, when a failure occurs in the active computer 1000, system switching is executed. In other words, when a failure occurs in the active computer 1000, and the failure detection program 1230 detects the failure, the failure detection program 1230 refers to the device switch table entry 1212 corresponding to a dump process for a previously registered logical volume, so that an address of a program registered in the entry is acquired (S7415).

Next, the failure detection program 1230 calls the program of the address acquired in step S5415. Then, the dump process program 1320 of the device driver 1300 is called and executed. The dump process program 1320 dumps the memory in the system to the logical volume. When the dump process is completed, the active computer 1000 recovers the failure to start as a new standby computer. At this time, processes after step S7450 described below are executed (S7420).

Next, the system starts in the standby computer 2000. The standby computer 2000, when starting the system, calls and executes the monitored access target logical volume registration program 2255. As a result, the device switch table entry 2211 is rewritten to be set so that the access request recording program 6310 is called when a write I/O request for a logical volume is made. When there are a plurality of logical volumes to be accessed under monitoring, this step is executed for each logical volume (S7450).

After the above processes, the access request notification reception program 6320 waits the access request notification packet 6400 from the active computer 1000. When a write I/O request is made, the access request notification packet 6400 is transmitted from the access request recording program 6110. The access request notification reception program 6320 executes its process in accordance with the received access request packet 6400 (S7455).

Next, system switching is executed in the standby computer 2000 when a failure occurs. The system switching control program 6200 of the standby computer 2000, when detecting a failure occurred in the active computer, calls the consistency check program 6250 to check consistency of the logical volume (S7460).

Next, the consistency check program 6250 called from the system switching control program 6200, in accordance with a row of logical volumes delivered as a parameter, checks consistency of the logical volume. At this time, when there is an interrupted write I/O, a recovery program is executed. The recovery program copies between an area in which the interrupted I/O is to be executed and another physical volume to recover the inconsistency. All areas corresponding to the logical volume may be copied (S7465). After the above processes, the system switching control program 6200 takes over jobs to restart the jobs as a new active computer (S7470).

Third Embodiment

Next, referring to FIGS. 23 to 29, a third embodiment is explained. A difference between the third embodiment and first and second embodiments is that, when a write I/O is executed from the active computer to the shared disk, an address of a logical volume in which the I/O is currently processed is recorded on the logical volume, and when the I/O is completed, the record is unregistered. As a result, when the write I/O is forcibly interrupted due to a failure, a record of the address of the logical volume currently processed remains on the logical volume, and thus inconsistency state can be detected.

Figure 23:
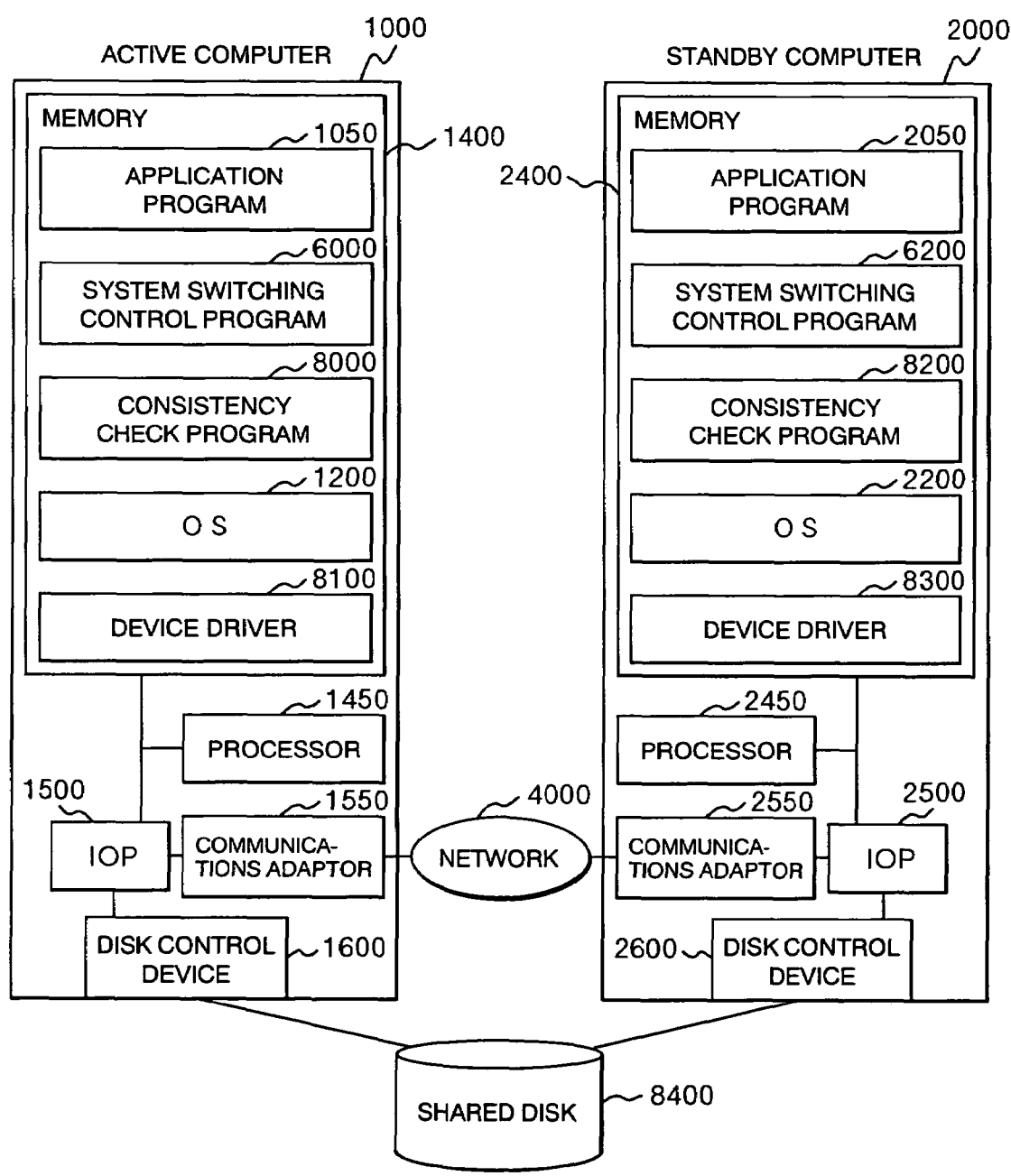
FIG. 23 is an overview block diagram of a hot standby system in a third embodiment.

FIG. 23 shows a structure of a computer system of the third embodiment. Because the components other than consistency check programs 8000, 8200, device drivers 8100, 8300, and a shared disk 8400 are the same as the second embodiment, they are not explained. Because the components 8200, 8300 of the standby computer 2000 are the same as the components 8000, 8100 of the active computer 1000, they are explained using the active computer 1000.

Figure 24:
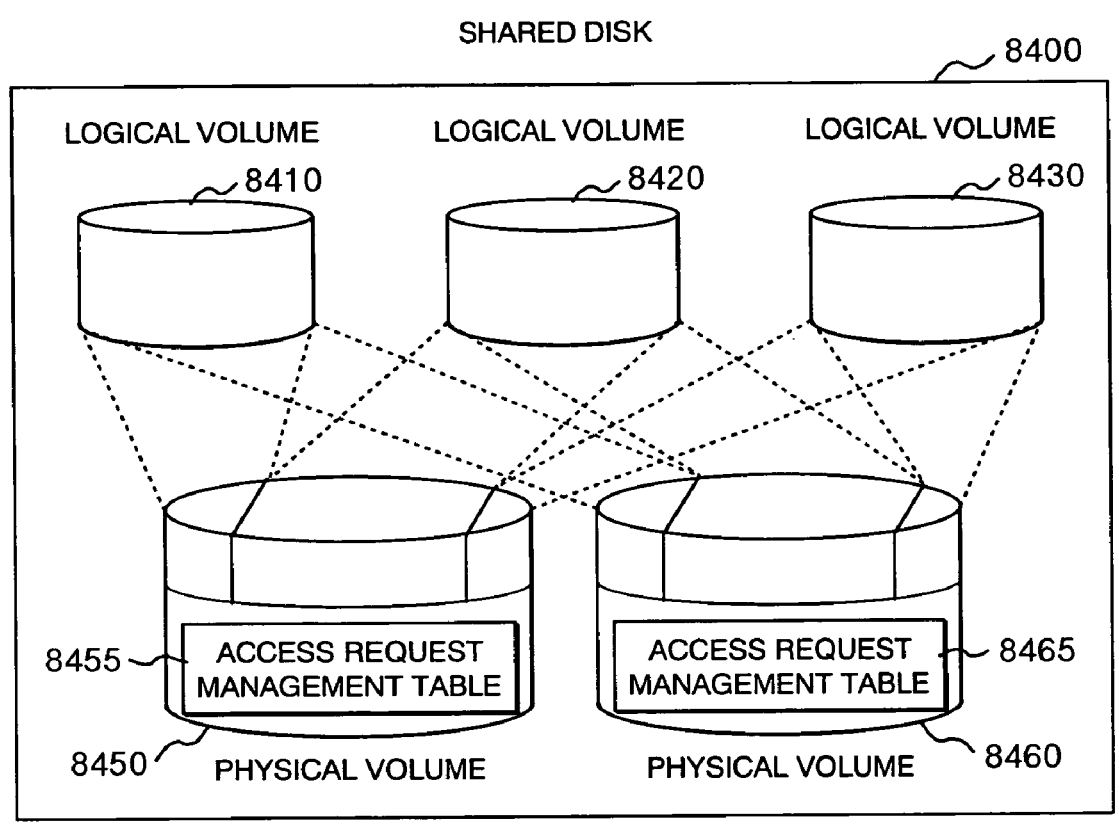
FIG. 24 is a block diagram of a shared disk 8400 in the third embodiment.

FIG. 24 shows a structure of the shared disk of the third embodiment. The shared disk 8400 includes a plurality of logical volumes 8410, 8420, 8430. An area of each logical volume corresponds to each of physical volumes 8450, 8460. Logical volumes may be in one-to-one correspondence with physical volumes. An area of a physical volume is divided, and part of the divided areas may be corresponded to logical volumes so that a plurality of the logical volumes share one physical volume. Additionally, an area other than the divided areas is provided, and stores access request management tables 8455, 8465 for recording write I/O requests. Device drivers 8100, 8300 update the access request management tables 8455, 8465 in executing an write I/O. The access request management table may be provided to each of the areas corresponding to the logical volumes. Each logical volume is provided with a logical volume ID, using which the logical volume is identified. Although a plurality of logical volumes are preferably provided, one logical volume may be provided.

Figure 25:
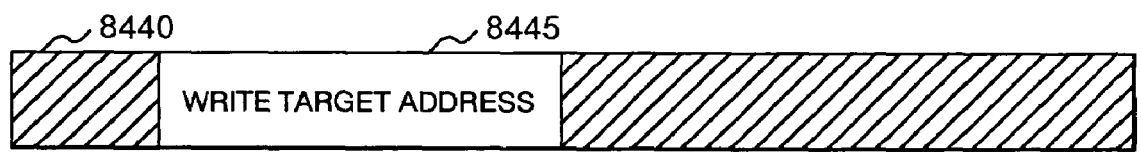
FIG. 25 is a block diagram of an access request management table entry 8440 in the third embodiment.

FIG. 25 shows a structure of the access request management table entry 8440 structuring the access request management table 8455 above described (the access request management table 8455 is not explained because it has the same structure). The access request management table 8455 includes one or a group of the access request management table entries 8440. Each entry 8440 includes a write target address 8445. The slashed portions may include other fields.

The write target address 8445 stores an address of an area in which the device driver 8100 executes a write I/O. For example, when a write I/O for the logical volume 8410 is executed, the access request management tables 8455, 8465 hold the access request management table entry 8440 in which the write target address 8445 stores an address of an area where the device driver 8100 executes the I/O, and then an actual I/O is executed. After a completion of the actual I/O, the entry held before the I/O is deleted. The entry may not be deleted to store a value indicating a completion of this I/O. The write process is executed for all the physical volumes corresponding to the logical volume in which the I/O is to be executed. Therefore, the same process is executed for the access request management table 8465.

Figure 26:
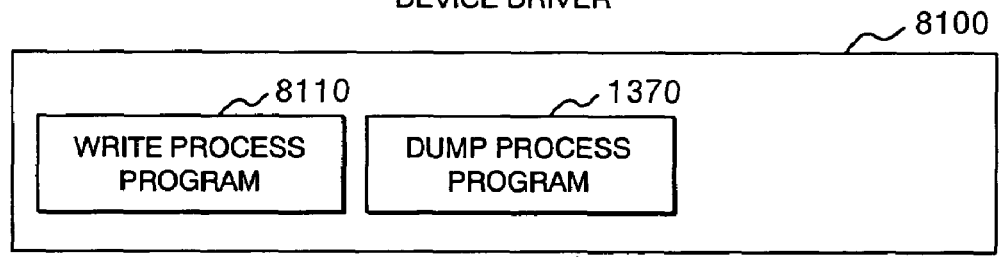
FIG. 26 is a block diagram of a device driver 8100 in the third embodiment.

FIG. 26 shows a structure of the device driver 8100 of the third embodiment. Although the structure and process of the dump process program 1370 are the same as the first and second embodiments, a process of the write process program 8110 is different from that of the first and second embodiments.

Figure 27:
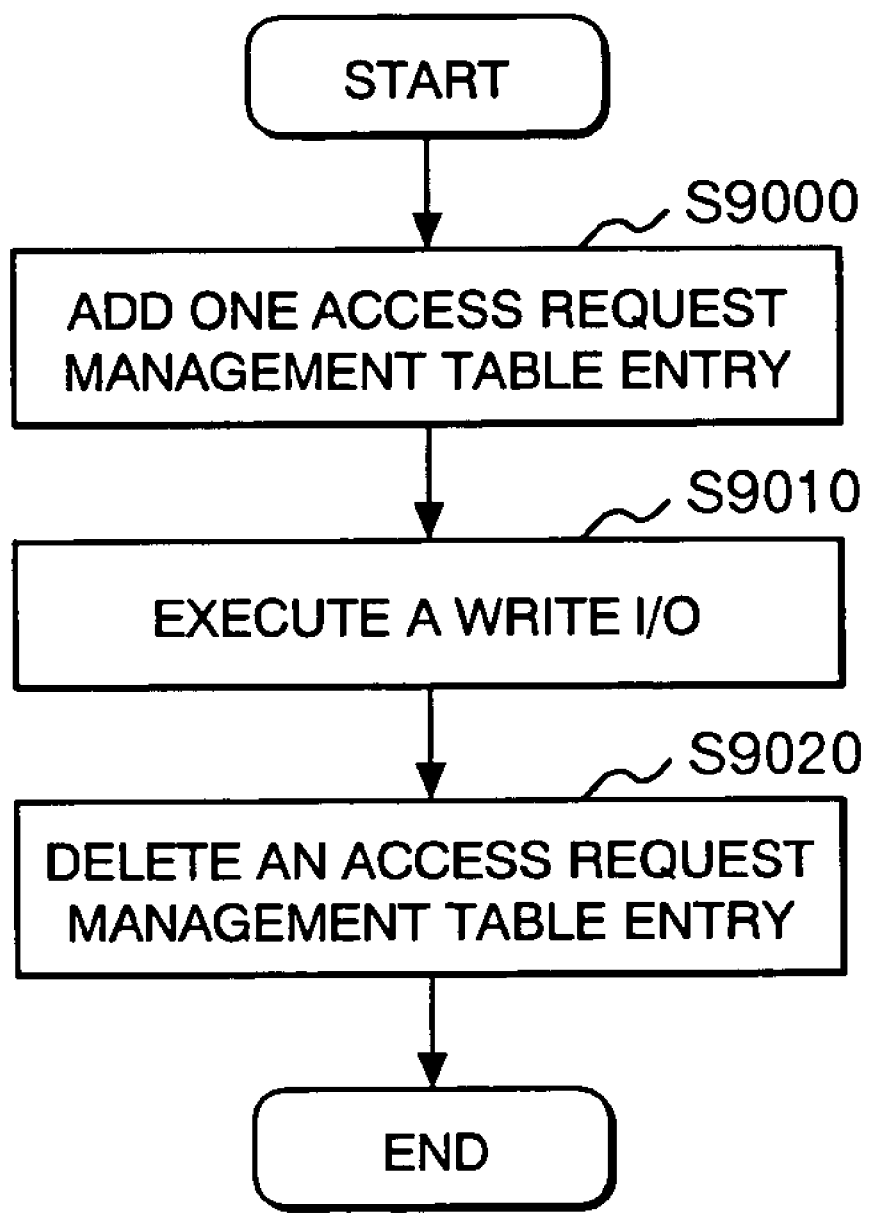
FIG. 27 is a process flow of a write process program 8110 in the third embodiment.

FIG. 27 shows a process flow of the write process program 8110 of the third embodiment. The write process program 8110, when a write I/O request is made, is called from the I/O process program 1220. The process of FIG. 27 is executed for each of physical volumes corresponding to a logical volume for which the I/O is to be executed.

First, one of the access request management table entries 8440 is added to the access request management tables 8455, 8465 of the physical volumes 8450, 8460 corresponding to the target logical volume 8410. At this time, an address of the logical volume in which the write I/O is executed is stored in the write target address 8450 (S9000). Next, an actual write I/O is executed for the logical volume 8410 (S9010). Finally, the access request management table entry 8440 added in step S9000 is deleted. At this time, a value indicating empty is stored in the area in which the write target address 8445 of this entry 8440 is stored (S9020). A value indicating a completion of this I/O may be stored without deleting the entry.

Figure 28:
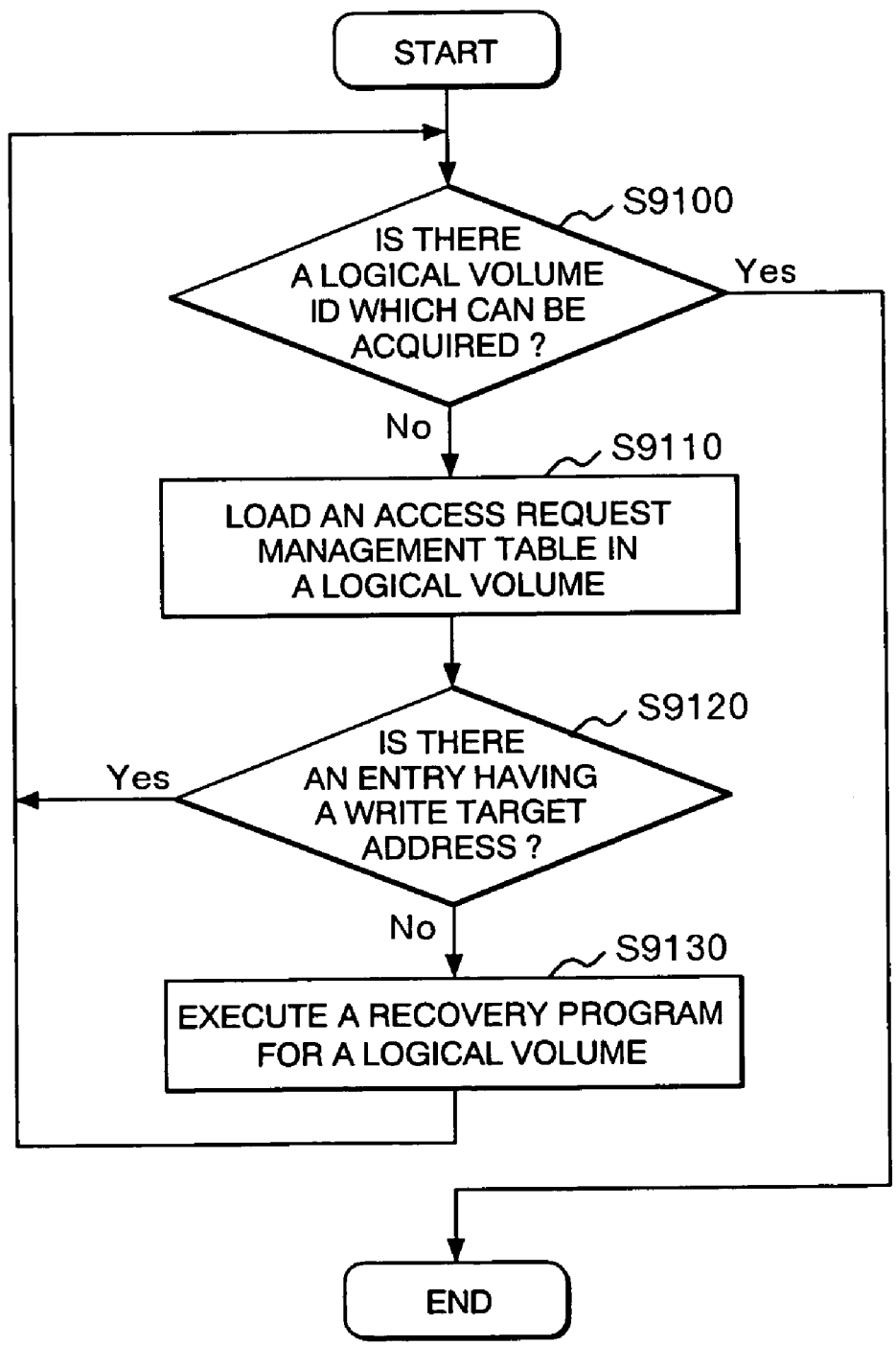
FIG. 28 is a process flow of a consistency check program 8200 in the third embodiment.

FIG. 28 shows a process flow of the consistency check program 8200 of the standby computer 2000 of the third embodiment. The consistency check program 8200, in system switching, is called from the system switching control program 6200. At this time, a row of IDs of logical volumes accessed under monitoring is received as a parameter. An additional parameter may be used.

First, it is judged whether a logical volume ID which can be acquired exists in the row of the logical volume IDs (S9100). When the logical volume ID which can be acquired is judged to exist, one logical volume ID is acquired. At this time, the acquired logical volume ID is deleted from the row of the IDs received as the parameter. Then, in accordance with the acquired logical volume ID, the access request management tables 8455, 8465 of the logical volume 8410 corresponding to the ID are loaded (S9110). On the other hand, when the logical volume ID which can be acquired is judged not to exist, the consistency check program 8200 completes its process.

Next, it is judged whether a value other than the value indicating empty exists in the write target address 8445 of the access request management tables 8455, 8465 loaded in step S9110. When there is no value other than the value indicating empty, a write I/O has been fully completed in a logical volume corresponding to the entry. Therefore, a recovery program does not need to be executed, so that the flow goes to step S9100 without executing the recovery program. On the other hand, when there is at least one value other than the value indicating empty, a logical volume corresponding to the entry may be currently processed, an interrupted write I/O may exist, and there may be inconsistency in the logical volume. Then, the flow goes to step S9130 to execute the recovery program for the logical volume (S9120). The recovery program copies part or all physical volumes corresponding to the logical volume to other physical volumes to recovery the inconsistency.

In step S9130, the recovery program is executed for the corresponding logical volume. As a result, when there is inconsistency in the logical volume, the recovery program recovers the inconsistency (S9130). The flow goes to S7300 after the execution of the recovery program, and the above steps are repeated.

Figure 29:
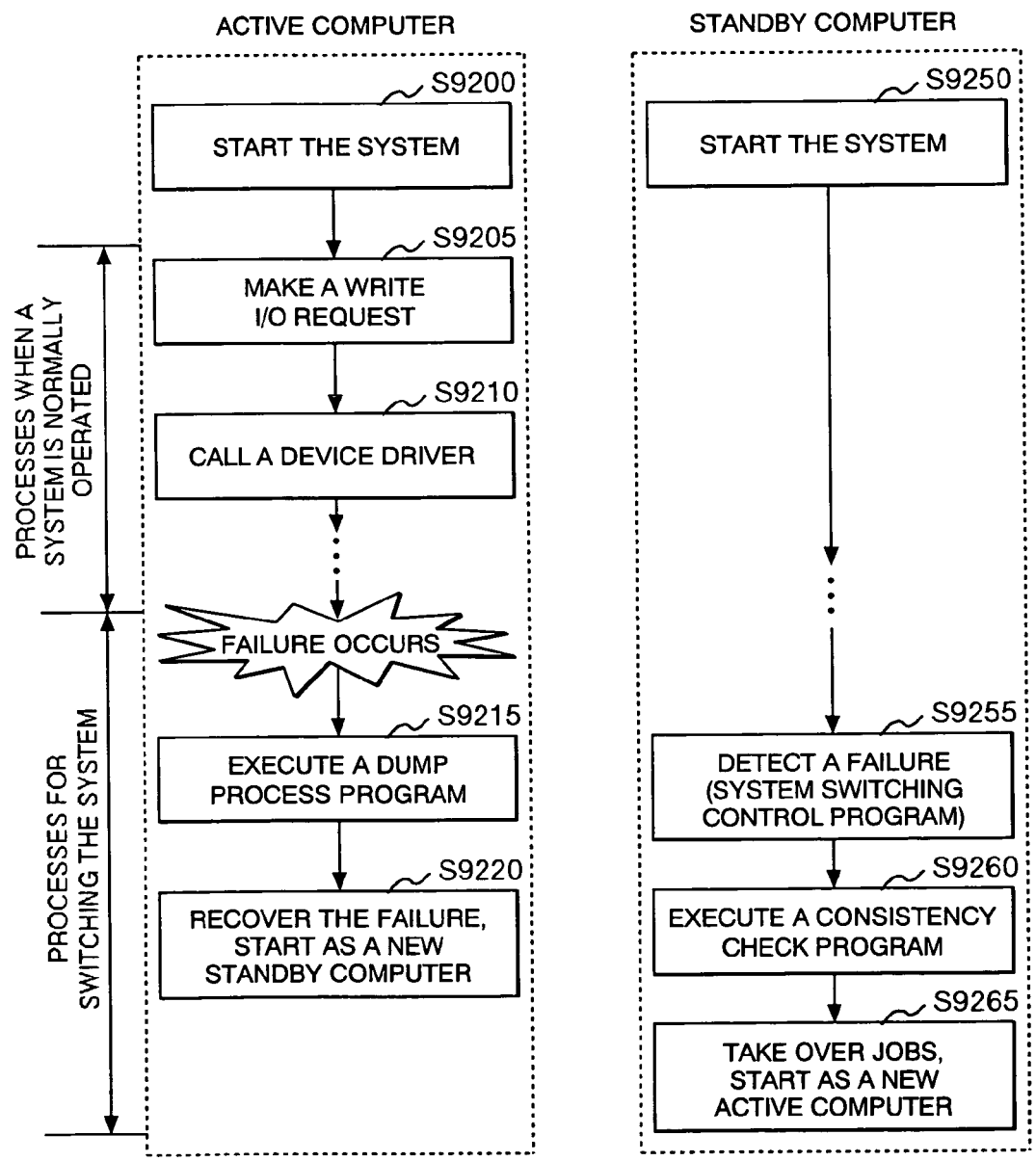
FIG. 29 is a flow of hot standby processing in the third embodiment.

FIG. 29 shows a flow of hot standby processing of the third embodiment. First, the system of the active computer 1000 starts (S9200). This start is the same as a normal way. Next, the processes when the active computer 1000 is normal operated are executed. In other words, when the application program 1050 issues a write I/O request to a logical volume, the I/O request process program 1220 of the OS 1200 is called and executed. The I/O request process program 1220, in accordance with the logical volume for which the I/O is executed and with a content of the process, refers to a content of the device switch table entry 1211 (S9205).

Next, the I/O request process program 1220 calls and executes the write process program 8110 registered in the device switch table entry 1211. The write process program 8110 adds one access request management table entry 8440 to the access request management tables 8455, 8465 to execute an actual I/O. Additionally, after the added access request management table entry 8440 is deleted, a completion of the I/O is notified to the calling application program 1050. Steps S9205, S9210 are repeated until a failure occurs in the active computer 1000 (S9210).

In this state, when a failure occurs in the active computer 1000, system switching is executed. In other words, when a failure occurs in the active computer 1000, and the failure detection program 1230 detects the failure, the failure detection program 1230 refers to the device switch table entry 1212 corresponding to a dump process for a previously registered logical volume, so that an address of a program registered in the entry is required (S9215).

Next, the failure detection program 1230 calls the program of the address acquired in step S5720. Therefore, the dump process program 1320 of the device driver 8100 is called and executed. The dump process program 1320 dumps the memory in the system to a logical volume (S9215). After a completion of the dump process, the active computer 1000 recovers the failure to start as a new standby computer. At this time, processes after step S9250 described below are executed (S9220).

Next, the system starts in the standby computer 2000 (S9250). After a completion of the start, the system switching control program 6200 monitors failures of the active computer 1000 (S9255).

Next, system switching is executed in the standby computer 2000 when a failure occurs. The system switching program 6200 of the standby computer 2000, when detecting a failure occurred in the active computer 1000, calls the consistency check program 8200 to check consistency of a logical volume (S9255).

Next, the consistency check program 8200 called from the system switching program 6200, in accordance with a row of logical volumes delivered as a parameter, loads the access request management tables in the logical volumes and checks the consistency. At this time, when there is an interrupted write I/O, a recovery program is executed for the logical volume (S9260). The recovery program copies part or all physical volumes corresponding to the logical volume to other physical volumes to recover the inconsistency. After a completion of the above processes, the consistency check program 8200 takes over jobs to restart the jobs in a new active computer (S9265).

As described above, when a failure occurs in the active computer 1000, consistency of the shared disk 3000 is checked before the standby computer 2000 takes over jobs. When there is inconsistency, it can be recovered.

According to the present invention, when a write I/O for a shared disk is interrupted due to a failure, and thus there may be inconsistency in the disk, a standby computer detects, diagnoses, and recovers the inconsistency, and takes over the interrupted write I/O. Additionally, because only a disk suspected of inconsistency is to be diagnosed and recovered, unnecessary processes are omitted to shorten a recovery time.

What is claimed is:

1. A method for controlling system switching in a hot standby system in which an active computer and a standby computer share a storage, the method comprising the steps of:

recording in a storage area, when a write I/O request for the storage is made, information about the I/O request currently processed;

verifying information recorded in the storage area by use of the standby computer when a failure occurs in the active computer; and recovering the storage when write is currently processed as a result of verifying the information, wherein, when a write I/O request for the storage is made, a notification about a start of the I/O is transmitted to the standby computer and the standby computer receives the notification about the start of the I/O to record in the storage area, information indicating that the I/O is currently processed, wherein, when the I/O request is completed in the active computer, a notification about a completion of the I/O is transmitted to the standby computer, wherein, when a process of the I/O request is completed in the active computer, the information recorded in the storage is deleted.

2. The method according to claim 1, wherein when a failure occurs in the active computer, information about the I/O request and the information being held in the storage area are transmitted to the standby computer, and the standby computer receives the I/O request from the active computer.

3. The method according to claim 1, wherein the notification about the start of the I/O to record and the notification about the completion of the I/O are transmitted from the active computer to the standby computer via a network.

4. The method according to claim 1, wherein:

the storage includes one or a plurality of logical volumes which are logically defined and respectively provided with unique identification information; and identification information about the logical volume to be accessed and information for counting a currently processed I/O request in I/O requests for the logical volume are stored, as information about the I/O request, in the storage area.

5. A method for controlling system switching in a hot standby system in which an active computer and a standby computer share a storage, the method comprising the steps of:

recording in a storage area, when a write I/O request for the storage is made, information about the I/O request currently processed;

verifying information recorded in the storage area by use of the standby computer when a failure occurs in the active computer; and recovering the storage when write is currently processed as a result of verifying the information, wherein, when a process of the I/O request is completed in the active computer, the corresponding information about the I/O request is deleted from the storage area.

6. A method for controlling system switching in a hot standby system in which an active computer and a standby computer share a storage, the method comprising the steps of:

recording in a storage area, when a write I/O request for the storage is made, information about the I/O request currently processed;

verifying information recorded in the storage area by use of the standby computer when a failure occurs in the active computer; and recovering the storage when write is currently processed as a result of verifying the information, wherein:

the information about the I/O request is stored in the storage area in a form of a table having entries for every I/O request;

information about the table is transmitted from the active computer to the standby computer via a network;

the standby computer acquires an entry from the received table and judges whether the counting information of the entry is a predetermined value; and when the counting information is the predetermined value, the standby computer does not execute a recovery program, and when the counter information is not the predetermined value, the standby computer executes the recovery program for the logical volume.

7. A hot standby system in which an active computer and a standby computer share a storage via a network, the storage comprising one or a plurality of volumes;

each of the active computer and the standby computer comprising a memory, a processor, and a control device for the storage, wherein each memory memorizes:

an application program for issuing an I/O request for the storage to process jobs;

a system switching control program for detecting a failure in a computer in which each memory is included, and for executing hot standby switching; and a consistency check program for checking consistency of volumes structuring the storage, and for executing a recovery program in accordance with a result of the checking, wherein:

the processor of the active computer, when a write I/O request for the storage is issued by the application program, transmits to the storage information indicating that the write I/O request is currently processed, monitors failures in the active computer, and when a failure occurs, notifies the failure to the system switching control program of the storage;

the processor of the standby computer references and verifies the information in the storage which indicates that the write I/O request is currently processed, and recovers the volumes of the storage when the write is currently processed as a result of the verification;

each memory further memorizes an access request monitoring program for monitoring an I/O request for volumes structuring the storage, and I/O request information holding an I/O request which an application program issues to the storage;

the processor of the active computer, when the application program issues a write I/O request to a volume in the storage, records in the memory information about the I/O request which is currently processed, under an execution of the access request monitoring program, monitors failures in the active computer, and transmits information about the I/O request held in the memory to a system switching control program of the standby computer when a failure occurs;

the processor of the active computer receives the information about the I/O request, verifies the information about the I/O request under an execution of the consistency check program, and when there is the I/O request which is currently processed as a result of the verification, recovers the volume of the storage; and the storage stores, as a record of the I/O request, a table including, as an entry of each I/O request, identification information about the volume to be accessed and information for counting a currently processed I/O request in I/O requests for the volume, and the processor deletes an entry corresponding to the I/O request from the table when a process of the I/O request is completed.

8. A hot standby system in which an active computer and a standby computer share a storage via a network, the storage comprising one or a plurality of volumes;

each of the active computer and the standby computer comprising a memory, a processor, and a control device for the storage, wherein each memory memorizes:

an application program for issuing an I/O request for the storage to process jobs;

a system switching control program for detecting a failure in a computer in which each memory is included, and for executing hot standby switching; and a consistency check program for checking consistency of volumes structuring the storage, and for executing a recovery program in accordance with a result of the checking;

wherein:

the processor of the active computer, when a write I/O request for the storage is issued by the application program, transmits to the storage information indicating that the write I/O request is currently processed, monitors failures in the active computer, and when a failure occurs, notifies the failure to the system switching control program of the storage;

the processor of the standby computer references and verifies the information in the storage which indicates that the write I/O request is currently processed, and recovers the volumes of the storage when the write is currently processed as a result of the verification;

each memory further memorizes an access request monitoring program for monitoring an I/O request for volumes structuring the storage, and I/O request information holding an I/O request which an application program issues to the storage;

the processor of the active computer, when the application program issues a write I/O request to a volume in the storage, records in the memory information about the I/O request which is currently processed, under an execution of the access request monitoring program, monitors failures in the active computer, and transmits information about the I/O request held in the memory to a system switching control program of the standby computer when a failure occurs;

the processor of the active computer receives the information about the I/O request, verifies the information about the I/O request under an execution of the consistency check program, and when there is the I/O request which is currently processed as a result of the verification, recovers the volume of the storage; and the access request monitoring program includes a monitored access target logical volume registration program for adding a specified volume to monitored access targets, a monitored access target logical volume deletion program, an access monitoring state acquisition program for notifying a current monitoring state of a logical volume in response to a query from outside or inside a program, an access request recording program for memorizing the request in the memory when the access request is a write request for the storage, and an access record transmission program for transmitting information stored in the memory to the standby computer via a network.

9. A hot standby system in which an active computer and a standby computer share a storage via a network, the storage comprising one or a plurality of volumes;

each of the active computer and the standby computer comprising a memory, a processor, and a control device for the storage, wherein each memory memorizes:

an application program for issuing an I/O request for the storage to process jobs;

a system switching control program for detecting a failure in a computer in which each memory is included, and for executing hot standby switching; and a consistency check program for checking consistency of volumes structuring the storage, and for executing a recovery program in accordance with a result of the checking, wherein the processor of the active computer, when a write I/O request for the storage is issued by the application program, transmits to the storage information indicating that the write I/O request is currently processed, monitors failures in the active computer, and when a failure occurs, notifies the failure to the system switching control program of the storage, wherein the processor of the standby computer references and verifies the information held in the storage and indicating that the write I/O request is currently processed, and recover the volumes of the storage when the write is currently processed as a result of the verification, wherein the processor of the active computer transmits a notification about a start of an I/O to the standby computer when the application program issues a write I/O request for a volume of the storage, transmits a notification about a completion of the I/O to the standby computer when the I/O request is completed, monitors failures in the active computer, and notifies, when a failure occurs, the failure to a system switching control program of the standby computer, wherein the processor of the standby computer receives the notification about a start of the I/O, stores in the memory information indicating the I/O is currently processed, starts the system switching control program in response to the notification from the active computer, verifies information indicating the I/O is currently processed and stored in the memory under an execution of the consistency check program, and recovers the volume of the storage when there is a currently processed write I/O request as a result of the verification, wherein the access request monitoring program includes a monitored access target logical volume registration program for adding a specified volume to monitored access targets, a monitored access target logical volume deletion program, an access monitoring state acquisition program for notifying a current monitoring state of a logical volume in response to a query from outside or inside a program, an access request recording program for memorizing the request in the memory when the access request is a write request for the storage, and an access record transmission program for transmitting information stored in the memory to the standby computer via a network.

* * * * *